(12) United States Patent
Gupta et al.

(10) Patent No.: US 11,277,433 B2
(45) Date of Patent: Mar. 15, 2022

(54) APPARATUS, METHOD, AND COMPUTER PROGRAM PRODUCT FOR AUTOMATIC NETWORK ARCHITECTURE CONFIGURATION MAINTENANCE

(71) Applicant: Honeywell International Inc., Morris Plains, NJ (US)

(72) Inventors: Tarun Gupta, Bangalore (IN); Prasanna Patil, Bangalore (IN); Chandrakanth Vittal S, Bangalore (IN); Manjunath Basavaraj Kama, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 307 days.

(21) Appl. No.: 16/670,840

(22) Filed: Oct. 31, 2019

(65) Prior Publication Data
US 2021/0136100 A1  May 6, 2021

(51) Int. Cl.
*H04L 12/24* (2006.01)
*H04L 29/06* (2006.01)
*H04L 41/0816* (2022.01)
*H04L 41/08* (2022.01)
(Continued)

(52) U.S. Cl.
CPC ...... *H04L 63/1433* (2013.01); *H04L 41/0816* (2013.01); *H04L 41/0876* (2013.01); *H04L 67/10* (2013.01); *G06F 9/44505* (2013.01)

(58) Field of Classification Search
None
See application file for complete search history.

(56) References Cited

U.S. PATENT DOCUMENTS

| 10,084,809 B1 | 9/2018 | Rambo et al. | |
|---|---|---|---|
| 2016/0072835 A1* | 3/2016 | Roytman | H04L 63/1433 726/25 |
| 2016/0373478 A1* | 12/2016 | Doubleday | G06F 8/65 |

(Continued)

OTHER PUBLICATIONS

Extended European Search Report issued in European Application No. 20202913.8 dated Nov. 13, 2020, 7 pages.

*Primary Examiner* — Angela Nguyen
(74) *Attorney, Agent, or Firm* — Alston & Bird LLP

(57) ABSTRACT

Various embodiments of the present disclosure are directed to automatic network architecture configuration maintenance. A network architecture for a particular organization, user, or other entity, may include various networked devices, any of which may be vulnerable to one or more cyberattacks due to outdated software, hardware, and/or firmware configurations. Embodiments include apparatuses, computer program products, and methods for retrieving an updated device configurations data object, identifying a vulnerable networked device set based at least in part on the updated device configurations data object and a detected networked device set, and generating a device cyber risk score data object set that may be output and/or otherwise provided to one or more systems, devices, or the like. Some example embodiments further include identifying update recommendation(s), generating device cyber risk priority data object(s), and/or providing various combinations of such data for rendering to one or more displays associated with a user.

20 Claims, 7 Drawing Sheets

(51) Int. Cl.
*H04L 67/10* (2022.01)
*G06F 9/445* (2018.01)

(56) References Cited

U.S. PATENT DOCUMENTS

| | | |
|---|---|---|
| 2018/0084000 A1 | 3/2018 | Baukes et al. |
| 2018/0351987 A1 | 12/2018 | Patel et al. |
| 2019/0096217 A1 | 3/2019 | Pourmohammad et al. |
| 2019/0347423 A1* | 11/2019 | Sanossian ........... H04L 63/1433 |
| 2021/0081189 A1* | 3/2021 | Nucci ................. H04Q 9/02 |

* cited by examiner

APPARATUS, METHOD, AND COMPUTER PROGRAM PRODUCT FOR AUTOMATIC NETWORK ARCHITECTURE CONFIGURATION MAINTENANCE

TECHNOLOGICAL FIELD

Embodiments of the present disclosure generally relate to cybersecurity threat detection and resolution, and specifically, to automatic generation of device cyber risk score data object(s) associated with vulnerable network device(s) of a network architecture, and to updating one or more configuration(s) of the network device(s) based on the detected device cyber risk score data object(s).

BACKGROUND

Often, various computing network architectures, especially large industrial computing systems, include various computing assets that utilize software, hardware, firmware, or other configurations that are vulnerable to one or more cyberattacks, such as outdated configurations. The existence of such network devices vulnerable to cyberattacks is exacerbated in instances where a network architecture receives improper maintenance, or little to no maintenance. Such vulnerable network devices must be updated to specific configurations that do not cause problems with the remainder of the network architecture and/or meet the requirements set by the associated network controlling entity. Applicant has discovered problems with current systems, methods, apparatuses, and computer program products for automatic network architecture configuration maintenance, and through applied effort, ingenuity, and innovation, Applicant has solved many of these identified problems by developing a solution that is embodied in the present disclosure, which is described in detail below.

BRIEF SUMMARY

Embodiments of the present disclosure provided herein include systems, methods, apparatuses and computer program products for automatic network architecture configuration maintenance. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with one aspect of the present disclosure, an apparatus for automatic network architecture configuration maintenance is provided. In at least one example embodiment, the apparatus includes at least one processor and at least one memory. The at least one memory includes computer-coded instructions thereon. The computer-coded instructions are configured to, in execution with the at least one processor, configure the apparatus to retrieve, from an external cloud system, an updated device configurations data object. The computer-coded instructions further configure the apparatus to identify a vulnerable networked device set based at least in part on a detected networked device set and the updated device configurations data object. The computer-coded instructions further configure the apparatus to generate a device cyber risk score data object set comprising a device cyber risk score data object associated with one or more vulnerable network devices of the vulnerable networked device set. The computer-coded instructions further configure the apparatus to output the device cyber risk score data object set.

Additionally or alternatively, in some example embodiments of the apparatus, outputting the device cyber risk score data object set comprises providing the device cyber risk score data object set for rendering via a display device.

Additionally or alternatively, in some example embodiments of the apparatus, the apparatus is further configured to generate a device cyber risk priority data object set comprising a device cyber risk priority data object associated with one or more vulnerable network devices of the vulnerable networked device set; and provide the device cyber risk priority data object set for rendering.

Additionally or alternatively, in some example embodiments of the apparatus, the updated device configurations data object comprises one or more of updated hardware configuration data, updated software configuration data, or updated firmware configuration data for one or more device types. Additionally or alternatively, in some example embodiments of the apparatus, the updated device configurations data object comprises one or more latest BIOS configuration data for one or more device types.

Additionally or alternatively, in some example embodiments of the apparatus, to retrieve the updated device configurations data object from the external system, the apparatus is configured to initiate a proxy service connection with the external system; transmit a configurations retrieval request to the external system via the proxy service connection; and receive the updated device configurations data object from the external system.

Additionally or alternatively, in some example embodiments of the apparatus, the apparatus is associated with a first device layer, and the detected networked device set comprises at least one networked device associated with a lower device layer. In some such example embodiments, the at least one networked device associated with the lower device layer comprises at least one L2 networked device or at least one L1 networked device.

Additionally or alternatively, in some example embodiments of the apparatus, to identify the vulnerable networked device set, the apparatus is configured to select a networked device from the detected networked device set; query the networked device to retrieve a current device configuration data object; compare the current device configuration data object and the updated device configurations data object to determine; and determine, based on the comparison, that the current device configuration data object indicates a configuration vulnerability. In some such example embodiments of the apparatus, to determine the current device configuration data object indicates the configuration vulnerability, the apparatus is configured to determine that the current device configuration data object does not match the updated device configurations data object.

Additionally or alternatively, in some example embodiments of the apparatus, the apparatus is further configured to identify an update recommendations set based on the device cyber risk score data object set; and provide the update recommendations set for rendering.

Additionally or alternatively, in some example embodiments of the apparatus, the apparatus is further configured to identify an update recommendations set based on the device cyber risk score data object set; and cause execution of at least one device update action based on the update recommendations set.

In accordance with another aspect of the present disclosure, a computer-implemented method for automatic network architecture configuration maintenance is provided. In at least one example embodiment of the computer-implemented method, the computer-implemented method is implemented via an apparatus, computing hardware, processing circuitry, or other means described herein. In some such example embodiments of the method, the method comprises retrieving, from an external cloud system, an updated device configurations data object. The example computer-implemented method further includes identifying a vulnerable networked device set based at least in part on a detected networked device set and the updated device configurations data object. The example computer-implemented method further includes generating a device cyber risk score data object set comprising a device cyber risk score data object associated with one or more vulnerable network devices of the vulnerable networked device set. The example computer-implemented method further includes outputting the device cyber risk score data object set.

Additionally or alternatively, in some example embodiments of the computer-implemented method, outputting the device cyber risk score data object set comprises providing the device cyber risk score data object set for rendering via a display device.

Additionally or alternatively, in some example embodiments of the computer-implemented method, the computer-implemented method further comprises generating a device cyber risk priority data object set comprising a device cyber risk priority data object associated with one or more vulnerable network devices of the vulnerable networked device set; and providing the device cyber risk priority data object set for rendering.

Additionally or alternatively, in some example embodiments of the computer-implemented method, the updated device configurations data object comprises one or more of updated hardware configuration data, updated software configuration data, or updated firmware configuration data for one or more device types.

Additionally or alternatively, in some example embodiments of the computer-implemented method, the updated device configurations data object comprises one or more latest BIOS configuration data for one or more device types.

Additionally or alternatively, in some example embodiments of the computer-implemented method, retrieving the updated device configurations data object from the external system comprises initiating a proxy service connection with the external system; transmitting a configurations retrieval request to the external system via the proxy service connection; and receiving the updated device configurations data object from the external system.

Additionally or alternatively, in some example embodiments of the computer-implemented method, the computer-implemented method further comprises the detected networked device set comprises at least one networked device associated with a lower device layer. Additionally or alternatively, in some such example embodiments of the computer-implemented method, the at least one networked device comprises at least one L2 networked device or at least one L1 networked device.

Additionally or alternatively, in some example embodiments of the computer-implemented method, identifying the vulnerable networked device set comprises selecting a networked device from the detected networked device set; querying the networked device to retrieve a current device configuration data object; comparing the current device configuration data object and the updated device configurations data object to determine; and determining, based on the comparison, that the current device configuration data object indicates a configuration vulnerability. Additionally or alternatively, in some such example embodiments of the computer-implemented method, determining the current device configuration data object indicates the configuration vulnerability comprises determining that the current device configuration data object does not match the updated device configurations data object.

Additionally or alternatively, in some example embodiments of the computer-implemented method, the computer-implemented method further comprises identifying an update recommendations set based on the device cyber risk score data object set; and providing the update recommendations set for rendering.

Additionally or alternatively, in some example embodiments of the computer-implemented method, the computer-implemented method further comprises identifying an update recommendations set based on the device cyber risk score data object set; and causing execution of at least one device update action based on the update recommendations set.

In accordance with another aspect of the present disclosure, a computer program product for automatic network architecture configuration maintenance is provided. In at least one example embodiment of the computer program product, the computer program product includes at least one non-transitory computer-readable storage medium having computer program instructions thereon. The computer program instructions, in execution with a processor, are configured to retrieve, from an external cloud system, an updated device configurations data object. The example computer program product is further configured to identify a vulnerable networked device set based at least in part on a detected networked device set and the updated device configurations data object. The example computer program product is further configured to generate a device cyber risk score data object set comprising a device cyber risk score data object associated with one or more vulnerable network devices of the vulnerable networked device set. The example computer program product is further configured to output the device cyber risk score data object set.

Additionally or alternatively, in some example embodiments of the computer program product, outputting the device cyber risk score data object set comprises providing the device cyber risk score data object set for rendering via a display device.

Additionally or alternatively, in some example embodiments of the computer program product, the computer program product is further configured to generate a device cyber risk priority data object set comprising a device cyber risk priority data object associated with one or more vulnerable network devices of the vulnerable networked device set; and provide the device cyber risk priority data object set for rendering.

Additionally or alternatively, in some example embodiments of the computer program product, the updated device configurations data object comprises one or more of updated hardware configuration data, updated software configuration data, or updated firmware configuration data for one or more device types. Additionally or alternatively, in some example embodiments of the computer program product, the updated device configurations data object comprises one or more latest BIOS configuration data for one or more device types.

Additionally or alternatively, in some example embodiments of the computer program product, to retrieve the updated device configurations data object from the external system, the computer program product is configured to initiate a proxy service connection with the external system;

transmit a configurations retrieval request to the external system via the proxy service connection; and receive the updated device configurations data object from the external system.

Additionally or alternatively, in some example embodiments of the computer program product, the processor is associated with a first device layer, and wherein the detected networked device set comprises at least one networked device associated with a lower device layer. Additionally or alternatively, in some such example embodiments of the computer program product, the at least one networked device associated with the lower device layer comprises at least one L2 networked device or at least one L1 networked device.

Additionally or alternatively, in some example embodiments of the computer program product, to identify the vulnerable networked device set, the computer program product is configured to select a networked device from the detected networked device set; query the networked device to retrieve a current device configuration data object; compare the current device configuration data object and the updated device configurations data object to determine; and determine, based on the comparison, that the current device configuration data object indicates a configuration vulnerability. Additionally or alternatively, in some such embodiments of the computer program product, to determine the current device configuration data object indicates the configuration vulnerability, the computer program product is configured to determine that the current device configuration data object does not match the updated device configurations data object.

Additionally or alternatively, in some example embodiments of the computer program product, the computer program product is further configured to identify an update recommendations set based on the device cyber risk score data object set; and provide the update recommendations set for rendering.

Additionally or alternatively, in some example embodiments of the computer program product, the computer program product is further configured to identify an update recommendations set based on the device cyber risk score data object set; and cause execution of at least one device update action based on the update recommendations set.

BRIEF DESCRIPTION OF THE DRAWINGS

Figure 1:
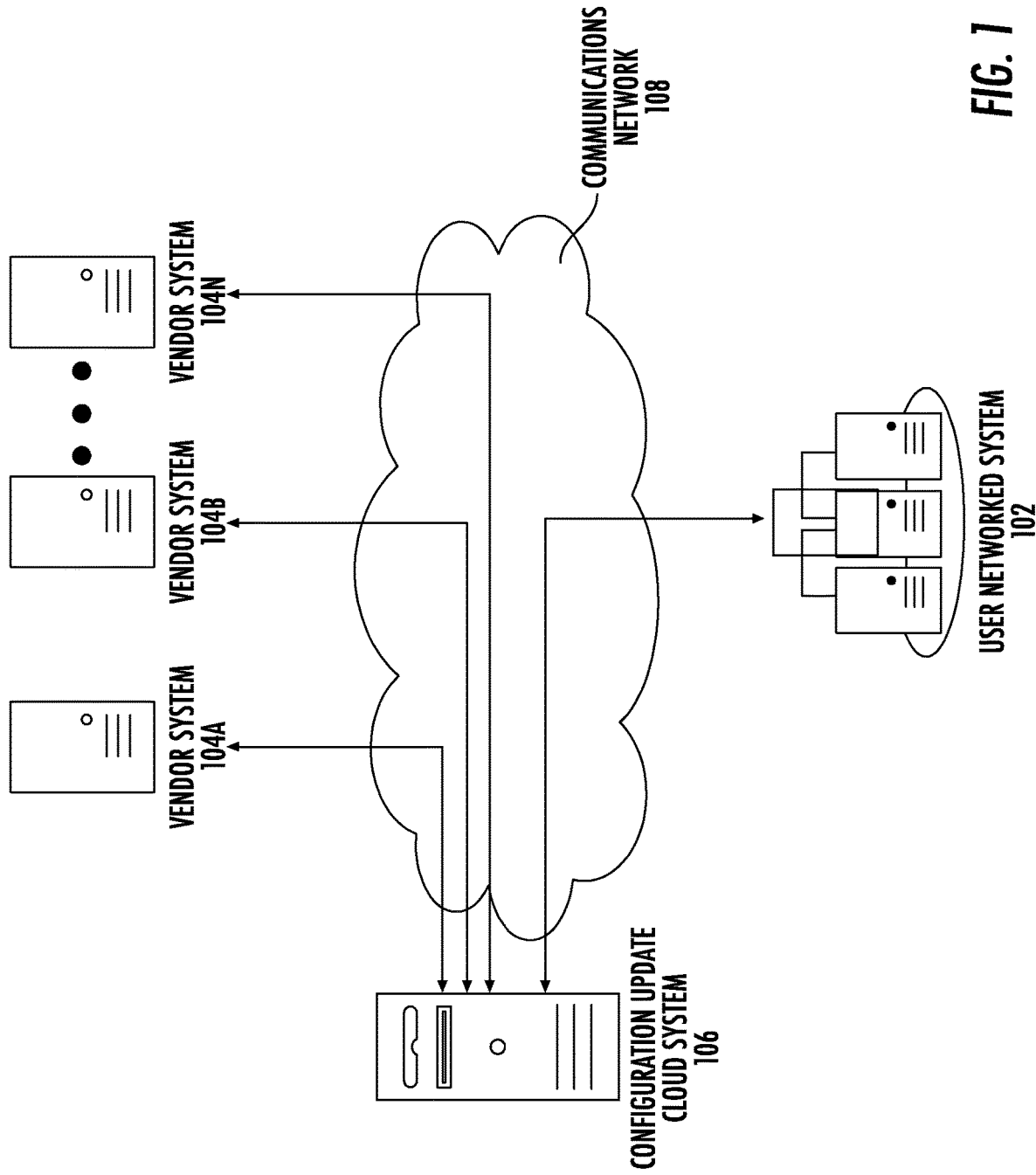
Figure 2:
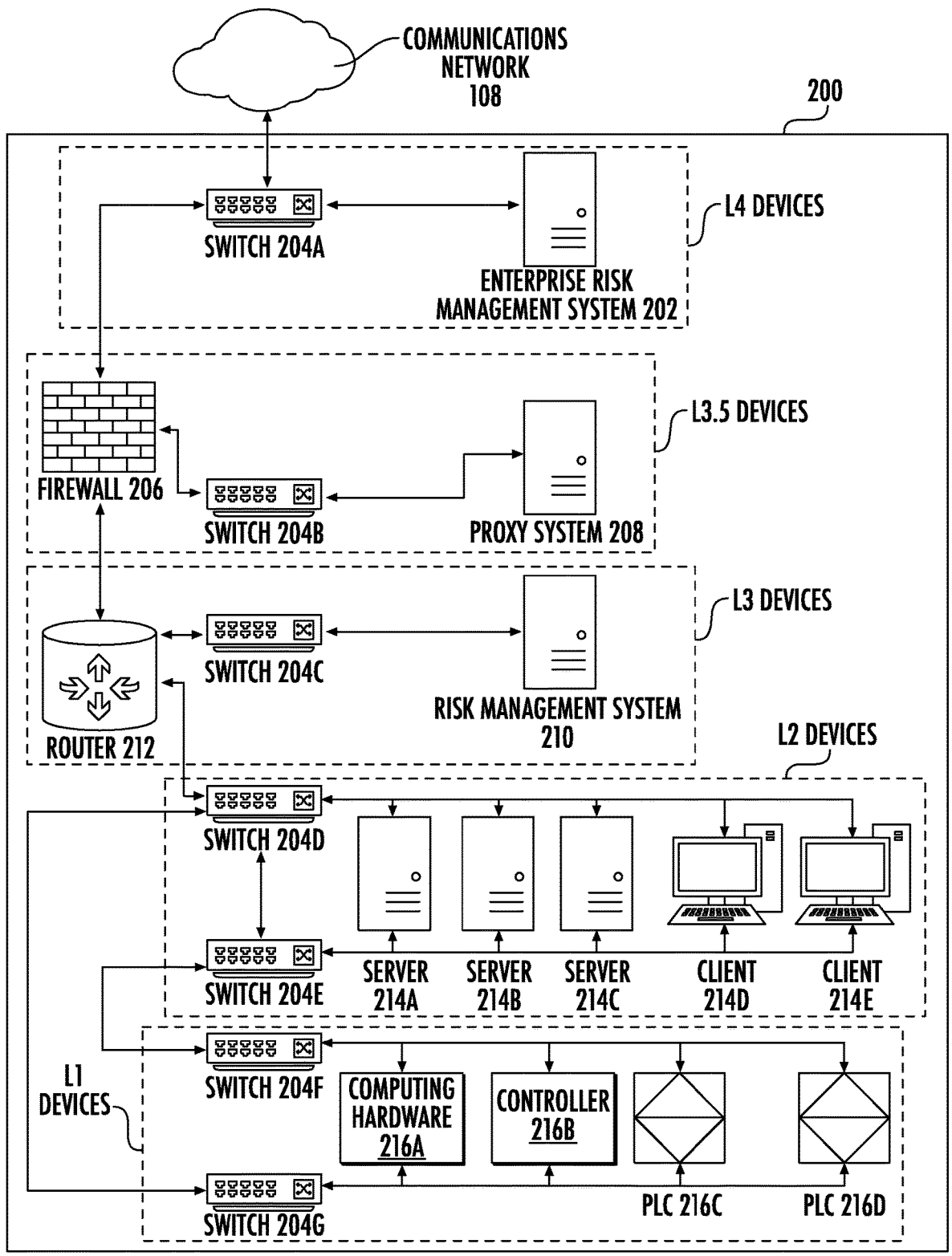
Figure 3:
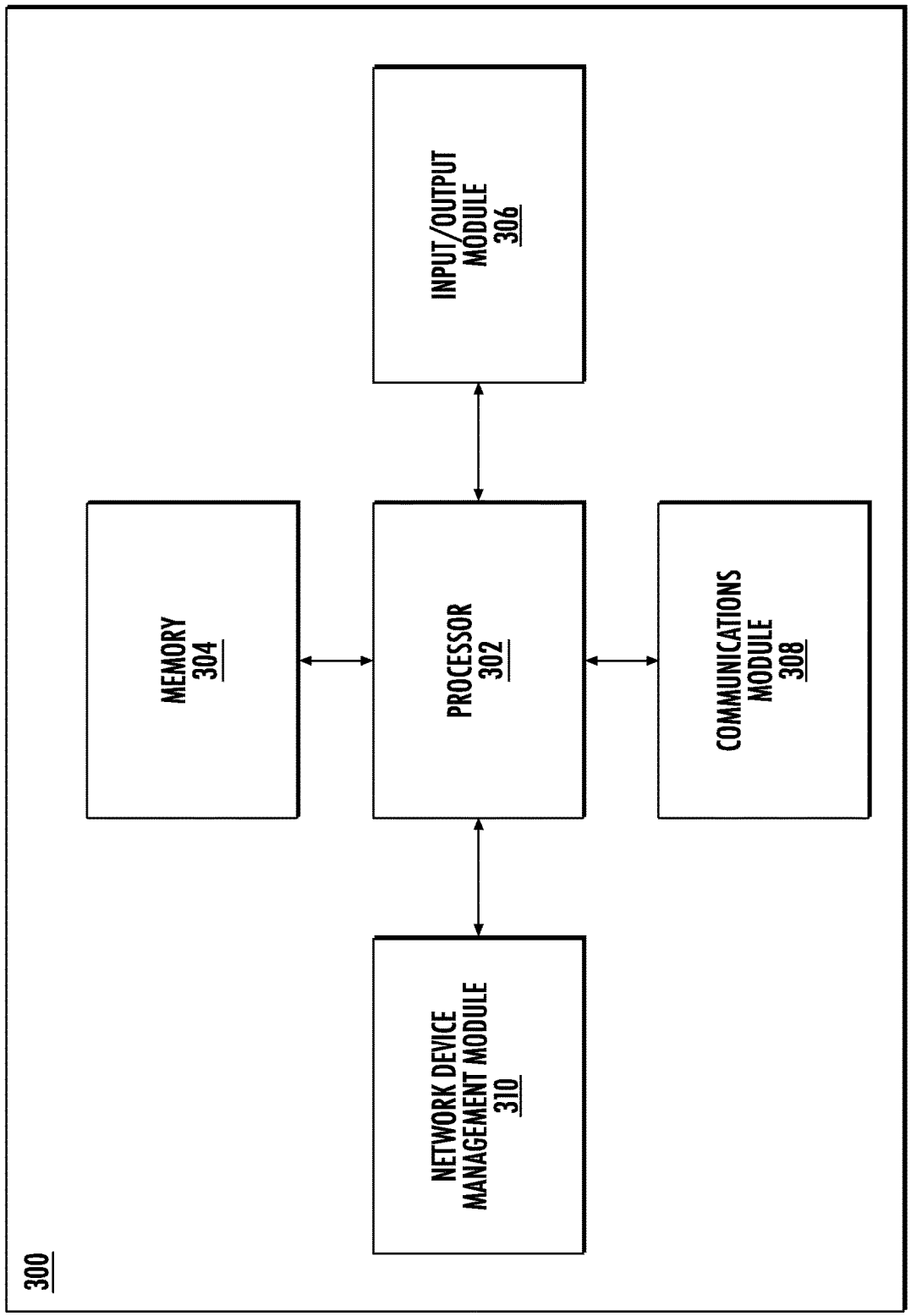
Figure 4A:
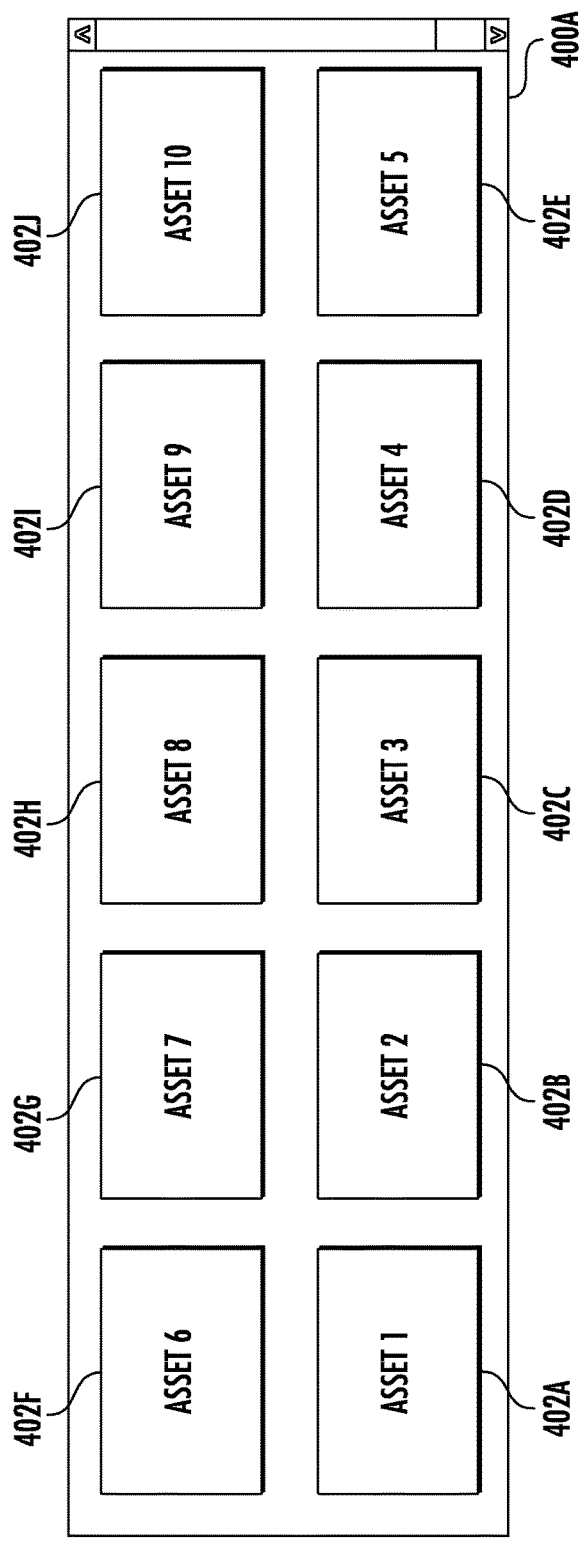
Figure 4B:
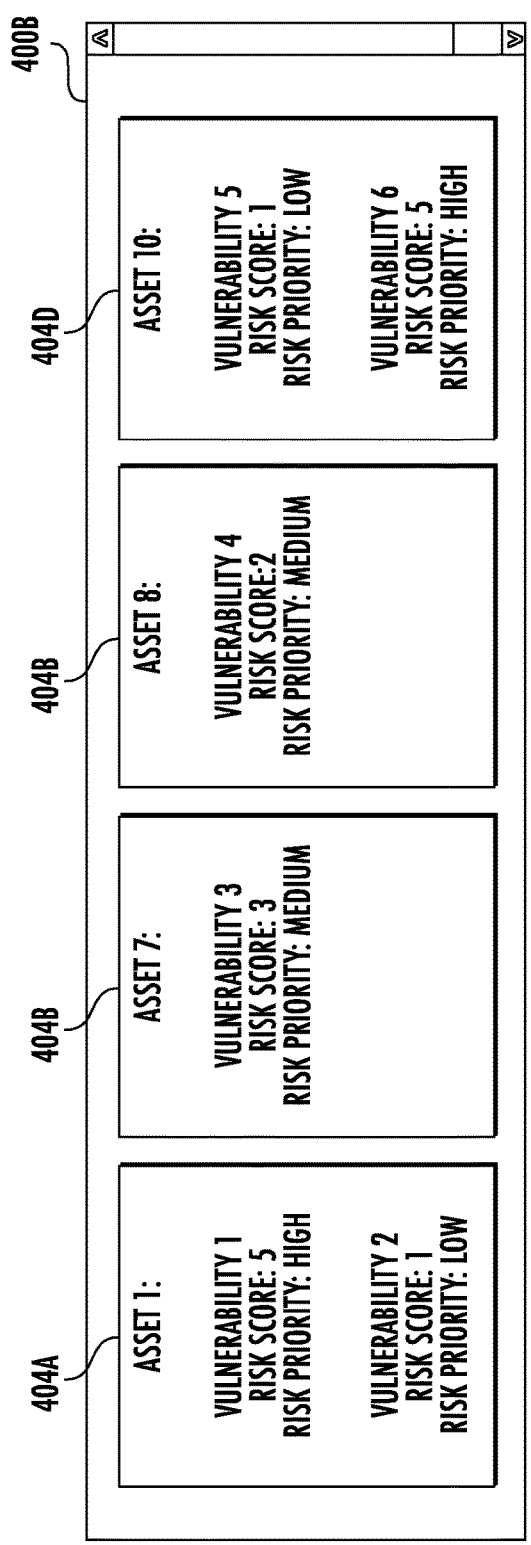

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of a user system that may be specially configured within which embodiments of the present disclosure may operate;

FIG. 3 illustrates a block diagram of an example apparatus that may be specially configured in accordance with an example embodiment of the present disclosure;

FIGS. 4A and 4B illustrate example example network architecture renderings in accordance with various embodiments of the present disclosure; and FIGS. 5-9 illustrate flowcharts including example operations for automatic network architecture configuration maintenance in accordance with various embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "provide" as used herein with respect to data refers to a transmission of data to another apparatus, system, device, or other computing hardware, across one or more networks for rendering of the data, or rendering or causing rendering by an apparatus, system, device, or other computing hardware for rendering by one or more displays associated with the apparatus, system, device, or other computing hardware. For example, in some embodiments a first apparatus provides a second apparatus, system, device, or the like, to cause rendering of that data. In other embodiments, a first apparatus provides data to a display associated with the first apparatus to cause rendering of the data to the display.

Overview

Various businesses, consumers, groups, individuals, and other entities rely on computing networks to perform various tasks efficiently while performing both safely and securely. In an example context, many large industrial entities manage a network architecture (or multiple network architectures) that include various networked devices arranged in a particular manner for a particular purpose. The networked devices may include any number of physical computing assets or virtual computing assets, where each computing asset (whether physical or virtual) may further include or otherwise be associated with one or more sub-assets. In some circumstances, the networked devices may be arranged into various tiered layers, such that each layer is associated with various devices having particular functionality and/or security implemented via hardware, software, firmware, or any combination thereof, or such that a particular layer is only in communication with particular networked devices within the layer associated with the networked device, or the layer directly above or directly below the networked device.

However, whether due to time or improper maintenance, network devices can become vulnerable to various cybersecurity threats due to reliance on vulnerable configurations of software, hardware, firmware, or any combination thereof. In larger and/or more complex network architectures that may include tens, or hundreds, of specially configured and arranged networked devices (e.g., network architectures associated with large industrial plants), diligent maintenance of such networked devices may be difficult or impossible to perform manually. Such difficulties are further exacerbated when updates to network configurations must be verified by a user associated with the network architecture to maintain overall stability of the network architecture. In this regard, not only is continuous monitoring of each networked device expensive, time consuming, tedious, and technically difficult, the combination of these elements make manual human updating of such networked devices impractical and significantly prone to human error, for example in failing to perform proper maintenance or updating a networked device to a configuration that destabilizes the network architecture.

However, without such maintenance to update configurations, networked devices remain vulnerable to various cybersecurity attacks. Any particular cybersecurity attack may cause various forms of harm to the associated entity and/or network architecture. For example, especially in recent times, cybersecurity threats have been leveraged by malicious actors to access sensitive data stored and/or transmitted using various vulnerable networked devices such as a field programmable gate array (FPGA) devices, network component devices, mobile device components, and/or the like. In another circumstance, one or more cybersecurity threats may be leveraged by malicious actors to negatively impact, or completely stop, operations associated with an industrial plant and/or one or more devices of an associated network architecture.

Various embodiments of the present disclosure are directed to apparatuses, methods, and computer program products for automatic network architecture configuration maintenance. In this regard, the various embodiments enable automatic network architecture configuration maintenance, including identification of vulnerable network device(s) and/or updating of such vulnerable network devices. Further, embodiments of the present disclosure enable rendering of device cyber risk score data object(s), and/or data derived therefrom or dated associated therewith, to a display for user viewing, analysis, and/or interaction.

In at least one aspect of the embodiments, embodiments provide for identification of vulnerable network devices, generation of a device cyber risk score data object set associated with the vulnerable network devices, and outputting and/or usage of the device cyber risk score data object set. Further, some embodiments of the present disclosure provide identification of an update recommendations set based on the device cyber risk score data object set. The updated recommendations set may be used for causing execution of at least one device update action based on the update recommendations set. The device update action(s) may update one or more software, hardware, and/or firmware configurations of at least one networked device to one or more corresponding updated device configurations. Additionally or alternatively, embodiments may provide for rendering of specific interfaces including various subsets of the above data, for example the vulnerable networked device set, the device cyber risk score data object set, the update recommendations set, and/or a combination thereof.

In this regard, embodiments of the present disclosure address various technical inefficiencies and problems, as well as human-caused problems and inefficiencies, by providing specific concrete technical solutions associated with particular technical advantages. The embodiments of the present disclosure improve overall cybersecurity associated with individual networked devices and associated network architectures. Further, embodiments of the present disclosure enable efficient and/or automatic decision-making regarding detected vulnerable network devices and executing updates associated with an identified updated recommendation set. Embodiments of the present disclosure thus reduce, or otherwise eliminate, inefficiencies and/or vulnerabilities associated with human-caused inefficiencies and/or vulnerabilities.

System Architecture and Example Apparatus

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In this regard, FIG. 1 discloses an example computing system in which embodiments of the present disclosure may operate. FIG. 1 illustrates an overview for a system configured for automatic network architecture maintenance in accordance with the present disclosure. A user networked system 102 may be embody various computing devices, hardware, and/or virtual devices arranged to form a particular network architecture. One or more hardware components, virtual components, and/or other networked device(s) of the user networked system 102 may be configured for automatically identifying vulnerable networked devices, generating data objects associated with the vulnerable network device(s) (e.g., a device cyber risk score data object set and/or update recommendations set), and/or executing actions (or causing execution of actions) associated with the generated data objects. The user networked system 102 may be in communication with a configuration update cloud system 106. The configuration update cloud system 106 may be in communication with one or more vendor systems 104A-104N (collectively "vendor systems 104").

The vendor systems 104 may each embody one or more servers, databases, and/or other computing hardware associated with a vendor, manufacturer, or other provider of physical and/or virtual computing hardware, software, and/or firmware. In some embodiments, for example, one or more of the vendor systems 104 may include device manufacturers. In other embodiments, for example, one or more of the vendor systems 104 may be associated with a provider of a computing hardware driver configuration, basic input/output system (BIOS) configuration, software configuration, firmware configuration, and/or the like. It should be appreciated that each of the vendor systems 104 may be associated with any number of hardware and/or virtual devices. Further, in this regard, each hardware and/or virtual device associated with a vendor system of the vendor systems 104 may be associated with updated configuration data associated with various facets of the hardware or virtual device (e.g., hardware, firmware, and software, and/or any combination thereof). Thus, another system, for example the configuration update cloud system 106, may communicate with any of the vendor systems 104 to retrieve updated configuration data associated with one or more physical and/or virtual devices. The vendor system 104 associated with a particular physical device or virtual device may be identified based on a device identifier, device type identifier, device manufacturer identifier, and/or other device-specific data, or a combination thereof, for the physical device or the virtual device.

The configuration update cloud system 106 may be embodied by a cloud service comprising one or more server(s), database(s), and/or other computing hardware in communication with the user networked system 102 and vendor systems 104. The configuration update cloud system 106 may maintain data embodying up-to-date configuration data for various computing hardware, devices, systems, and/or the like, each up-to-date configuration associated with a vendor linked to one of the vendor systems 104. For example, in some embodiments, the configuration update cloud system 106 may maintain an updated device configurations data object associated with various physical and/or virtual devices. The updated device configurations data object may include up-to-date configuration data of various types for a particular device set. In a particular context, the updated device configurations data object is embodied by a data file including up-to-date configuration details for various aspects of virtual and/or physical devices, for example up-to-date firmware, software, and/or hardware configurations for a plurality of virtual and/or physical devices identified from and/or otherwise embodied by the user networked system 102. In some embodiments, the configuration update cloud system 106 includes or is otherwise associated with one or more databases configured for storing up-to-date configuration details for various virtual and/or physical devices. The configuration update cloud system 106 may be configured to communicate with the one or more databases to store configuration details newly retrieved from one or more of the vendor systems 104, and/or to retrieve configuration details for use in providing to a user networked system 102. For example, the configuration update cloud system 106 may maintain the updated device configurations data object, in real-time or at particular update intervals, to include the most up-to-date configuration details for each associated device.

The user networked system 102 may include a networked device set, one or more of which may be configured to execute various actions for automatic network architecture configuration maintenance. In some embodiments, at least one device of the user networked system 102 is configured to receive user interaction and/or render one or more interfaces to an associated display visible to a user. It should be appreciated that, in some embodiments, the user networked system 102 includes one or a particular subset of devices configured to communicate with the configuration update cloud system 106. For example, one or more devices of the user networked system 102 may be configured to communicate with the configuration update cloud system 106 to retrieve an up-to-date version of an updated device configurations data object for one or more networked devices in the user networked system 102. In a particular context, the user networked system 102 may embody networked devices associated with functioning of an industrial plant.

The user networked system 102 and configuration update cloud system 106, and/or the configuration update cloud system 106 and vendor systems 104, may communicate via a communications network 108. The communications network 108 may include any combination of one or more wired and/or wireless communication network including, for example and without limitation, a wired or wireless local area network (LAN), personal area network (PAN), metropolitan area network (MAN), wide area network (WAN), or the like, as well as hardware, software, and/or firmware for implementing the network (for example, network routers and the like). For example, the communications network 108 may include, in some contexts, a cellular telephone, an 802.11, 802.16, 802.20, and/or WiMax network. In some embodiments, the communications network 108 includes a public network, such as the Internet, a private network, such as an intranet, or any combination thereof. The communications network 108 may utilize any number of a variety of networking protocols now available or developed later, including, without limitation, TCP/IP based networking protocols. For instance, the networking protocol may be customized to suit the needs of the user networked system 102, vendor systems 104, and/or the configuration update cloud system 106. In some embodiments, the protocol includes and/or embodies a custom protocol of JSON, XML, or other structured data objects. In other embodiments, the protocol includes and/or embodies one or more custom unstructured data protocols.

In addition to transmitting and/or receiving requests and/or other transmissions, the configuration update cloud system 106 and/or user networked system 102 (or particular devices therein) may be configured to determine, parse, extract, and/or otherwise identify metadata associated with a received transmission. For example, the configuration update cloud system 106 may be configured to extract device identification information, transmission sent and/or received timestamps, and/or other information from transmissions received from any of the vendor devices 104 and/or any device of the user networked system 102.

In a particular embodiment, the user networked system 102 may be embodied by the network architecture 200 illustrated in FIG. 2. In an example context, the system 200 may embody a particular network architecture associated with an industrial plant. It should be appreciated that the particular devices depicted and described with respect to FIG. 2 are meant described for illustrative and example purposes only. In other embodiments, other network architectures may include one or more additional and/or alternative components than those depicted with respect to network architecture 200. Additionally or alternatively, other network architectures may include one or more alternative arrangements of one or more of the computing devices depicted with respect to network architecture 200. In this regard, the particular network architecture depicted with respect to FIG. 2 is not to limit the scope or spirit of this disclosure.

The network architecture 200 may include various computing devices, each associated with a different network architecture layer. Each network architecture layer may be protected by one or more physical and/or virtual devices. Similarly, in some embodiments, only a subset of devices within each layer (e.g., one or more switches, routers, and/or the like) is configured to communicate with one or more other devices of another layer. Additionally or alternatively, one or more of the computing devices depicted with respect to the network architecture 200 may be configured to enable communications with one or more external systems and/or devices, for example communications with a configuration update cloud system 106 through one or more communications network(s), such as communication network 108.

It should also be appreciated that the network architecture 200 may include any number of computing devices associated with a display visible to one or more users, and/or associated with one or more peripherals, engageable displays, and/or other hardware configured to receive user interaction. As illustrated, the risk management system 210 may be configured to provide such functionality. The risk management system 210 may be a client device associated with the network architecture 200, and/or otherwise associated with the industrial plant (or other computing environment) such that a user may access and utilize the risk management system 210. In yet other embodiments, the risk management system 210 is entirely automated, and does not include such user-facing components.

In some embodiments, the network architecture 200 includes a L4 device set configured to enable communications over communications networks 108. For example, the L4 device set may be utilized to transmit one or more requests for up-to-date device configuration data from a configuration update cloud system 106, and/or receive an updated device configurations data object comprising such up-to-date device configuration data. It should be appreciated that, in other embodiments, the L4 device set may include one or more computing devices for use in communicating with one or more additional and/or alternative external computing systems.

As illustrated, the L4 device set may include one or more switches, for example switch 204A and one or more servers, for example enterprise risk management system 202. In some example contexts, the L4 device set may enable communication between the network architecture 200 and one or more external devices. The L4 device set may be remote from the devices of one or more other layers associated with the network architecture 200. For example, a portion (or all) of the L4 device set may be configured to communicate with one or more devices of another layer (e.g., one or more L3.5 devices) over a network. The network may be embodied by the communications network 108, or may be embodied by one or more other communication networks not accessible by external devices (e.g., one or more intranet communication networks). In this regard, the networked device set may form a networking demilitarized zone for securing communications between various devices communicating over public networks (e.g., over the Internet), for example alone or in conjunction with the L3.5 device set, and internal communications associated with an internal network architecture (e.g., the L3 device set and lower device layers, for example the L2 device set and L1 device set).

The enterprise risk management system 202 may embody one or more servers, alone or in combination with one or more databases, configured for retrieving and/or storing configuration data associated with the a sub-network architecture of the network architecture 200. For example, in some embodiments, the enterprise risk management system 202 may be configured to store a last-retrieved device configurations data object. The last-retrieved device configurations data object may represent previously retrieved configuration data retrieved from a configuration update cloud system, such as the configuration update cloud system 106. In this regard, the last-retrieved device configurations data object may represent the most up-to-date configuration data at the time of retrieval. The enterprise risk management system 202 may be configured to update the last-retrieved device configurations data object based on a newly retrieved updated device configurations data object retrieved from the configuration update cloud system, for example such that the last-retrieved device configurations data object represents the most up-to-date configuration data for all network devices associated with one or more layers of the network architecture 200.

In some such embodiment, the enterprise risk management system 202 may be configured to retrieve the updated device configurations data object at one or more set intervals, and store the newly retrieved updated device configuration data object as the last-retrieved device configurations data object. For example, in some embodiments, to retrieve the updated device configurations data object, the enterprise risk management system 202 may request the data object from a configuration update cloud system at daily, weekly, monthly, semi-annually, annually, or other time intervals (e.g., at any pre-determined and set time interval). The enterprise risk management system 202 may be configured to track a timestamp interval since last retrieval to determine whether sufficient time has elapsed to retrieve a subsequent updated device configurations data object. In other embodiments, the enterprise risk management system 202 may retrieve the updated device configurations data object in response to user engagement (e.g., upon initiation of a request by a user of another networked device), or upon a detected change in the network architecture (e.g., removal of one or more networked devices and/or addition of a new networked devices). Further, it should be appreciated that in some embodiments, the enterprise risk management system 202 may retrieve the updated device configurations data object automatically. For example, the enterprise risk management system 202 may subscribe to receive update notifications from the configuration update cloud system. In some such embodiments, the enterprise risk management system 202 may retrieve the updated device configurations data object by receiving an update notification from the configuration update cloud system, where the update notification includes the updated device configurations data object.

The L4 device set similarly includes switch 204A. Switch 204A may be configured for routing transmissions from the enterprise risk management system 202, one or more external systems (e.g., a configuration update cloud system), and/or one or more lower-layer devices (e.g., from layer 3.5, which may have been propagated from layer 3, layer 2, and/or layer 1). Additionally or alternatively, the switch 204A may be configured for routing transmissions to the enterprise risk management system 202, one or more external systems, and/or one or more lower-layer devices. For example, the switch 204A may be configured to perform network address translation functionality associated with incoming and/or outgoing transmissions. Additionally or alternatively, it should be appreciated that the switch 204A may include various outer-layer transmission security capabilities, quality of service capabilities, and/or the like to securely enable such functionality.

As illustrated, the L4 switch 204A may be configured to communicate with various networked devices of another layer associated with the network architecture 200. For example, the L4 switch 204A may enable communications with a L3.5 device set. As illustrated, the L3.5 device set may include one or more firewall(s), for example firewall 206, one or more switches, for example switch 204B and one or more sub-systems, for example proxy system 208. In some example contexts, the L3.5 device set may enable secure transmission of communication between the L3.5 device set, and/or lower-layer devices, and the L4 device set and/or remote devices. In some embodiments, the L3.5 device set may be remote from the devices of the L4 devices, for example where the L3.5 device set is locally positioned in close proximity to one or more of the L3 device set, L2 device set, and/or L1 device set. In other embodiments, the L3.5 device set may remotely located from the L4 device set and remotely located from the L3 device set, L2 device set, and/or L1 device set.

In some embodiments, the network layer 3.5 embodies a networking demilitarized zone for securing communications between the higher network layers and the lower network layers. In this regard, the L3.5 device set may be located proximate, and/or in an environment in close connection to, at least the L3 device set. In an example context, to secure communications between the various layers, a custom port is opened between the L3 device set and L3.5 device set, and another custom port between the L3.5 device set and L4 device set.

The L3.5 device set includes firewall 206. The firewall 206 may be a physical and/or virtual device that maintains a security standard associated with the network architecture 200, and/or a sub-network architecture thereof (e.g., security associated with other networked devices of the L3.5 device set, the L3 device set, L2 device set, and/or L1 device set). In this regard, the firewall 206 may be configured to filter transmissions incoming from the L4 device set and/or external system(s), and filter transmissions outgoing to the L4 device set and/or external system(s). The firewall 206 may additionally apply one or more security frameworks to incoming and/or outgoing transmissions. In some embodiments, the firewall 206 may be integrated with one or more of the switch 204B or proxy system 208. As illustrated, for example, the firewall 206 includes device connections with the L3.5 switch 204B (for example, to communicate with the other networked devices of the L3.5 device set) and the router 212 (for example, to communicate with the L2 switch 204D for communication with one or more of the networked devices in the L2 device set or L1 device set).

The L3.5 device set further includes proxy system 208. The proxy system 208 may be embodied by one or more physical servers and/or virtual servers (e.g., embodied by one or more software applications). The proxy system 208, in some embodiments, is configured to function as an intermediary communication node for transmissions between one or more devices of the L3 device set, and the L4 device set and/or external devices (e.g., to the enterprise risk management system 202 and/or an external resource). In some embodiments, the proxy system 208 may function as a network address translation layer for improving the security associated with the lower-layer devices of the network architecture 200 (e.g., the L3 device set, L2 device set, and/or L1 device set).

As illustrated, the L3.5 switch 204B may be configured to facilitate communications with various networked devices of the L3.5 device set. As illustrated, this may include firewall 206 and proxy system 208. For example, in this regard, transmissions incoming from the L4 device set may be received from the firewall 206, and transmitted through the L3.5 switch 204B for processing by the proxy system 208. Similarly, in some embodiments, transmissions outgoing from the L3 device set may be received from the firewall 206, and transmitted through the L3.5 switch 204B to the proxy system 208 for processing (e.g., to configure the transmission for secure communications with one or more external devices through the L4 device set).

Network layer 3 and below may form a secure internal network architecture associated with the network architecture 200. In this regard, the L3 device set, L2 device set, and L1 device set may form the internal sub-network architecture separate from the L3.5 device set and L4 device set. One or more of the networked devices in the L3.5 device set and/or L4 device set may perform network address translation and/or other security capabilities to prevent undesired external access to one or more of the networked devices in the internal sub-network.

As illustrated, the L3 device set includes risk management system 210, L3 switch 204C, and router 212. In some embodiments, the risk management system 210 embodies one or more servers, systems, or other computing hardware that enables access to various functionality associated with performing automatic network architecture configuration maintenance. The risk management system 210 may be configured to identify a network architecture comprising the networked devices of each lower-layer within the network architecture 200. Further, in some embodiments, the risk management system 210 is configured for detecting outdated networked devices in the identified network architecture (e.g., a sub-network comprising at least the L2 device set and/or L1 device set). Additionally or alternatively, in some embodiments, the risk management system 210 identifies, provides, and/or causes execution of one or more update recommendation action(s) associated with vulnerable network devices. In some embodiments, the risk management system 210 embodies a user-facing system that enables provision of one or more user interfaces, and/or receiving of user interaction associated with initiating detection of vulnerable networked devices, and/or receiving of user interaction associated with initiating one or more update recommendation action(s). In other embodiments, the risk management system 210 is configured to operate automatically (e.g., in response to particular signals received via the network and/or at particular time intervals).

Router 212 may be configured for communication between the L3 device set and one or more sub-networks. For example, the router 212 may be configured to enable communications with an internal sub-network including at least the L2 device set and L1 device set. In some embodiments, the router 212 may additionally or alternatively be connected to one or more additional sub-networks. The router 212 may be configured with any of a number of security capabilities for securing incoming and/or outgoing communications. For example, the router 212 may be configured with IP security (IPsec) capabilities, virtual private network IPsec capabilities, additional firewall capabilities, and various WAN and/or LAN security capabilities.

As illustrated, the L3 switch 204C may be configured to communicate with one or more networked device of the L3.5 device set, such as the L3.5 switch 204B, as well as the risk management system 210, and router 212 for enabling communications with various networked devices of a lower-layer associated with the network architecture 200. For example, the L3 switch 204C may communicate with router 212 to enable secure communications with the L2 device set and L1 device set. It should be appreciated that the L3 switch 204C may be configured with various security capabilities for blocking, filtering, and/or otherwise controlling transmissions incoming from the L3.5 device set, and/or outgoing through the router 212 from the L2 device set and/or L1 device set.

The L2 device set comprises L2 switch 204D, L2 switch 204E, server devices 214A-214C, and client devices 214D-214E. Additionally, to enable each of the servers 214A-214C and clients 214D-214E to access various networked devices of the L1 device set and/or utilize networking resources in an efficiently shared manner, the L2 switches 204D and 204E may be configured for communication with one another. It should be appreciated that, in other embodiments, the L2 device set may include any number of additional and/or alternative computing devices, and/or may not include one or more of the depicted computing devices.

Each of the servers 214A-214C may be associated with various functionality, including without limitation application functionality associated with controlling one or more of the networked devices of the L1 device set. In some embodiments, each of the servers 214A-214C may be associated with a subset of networked devices in the L1 device set. Further, in some embodiments, one or more of the servers 214A-214C may be configured to, alone or together with the L2 switch 204D and/or L2 switch 204E, enable execution of one or more update action associated with one or more of the L1 devices. The clients 214D-214E may be configured as user-facing devices for providing various interfaces via one or more displays, and/or receiving user interaction associated with accessing functionality provided by the servers 214A-214C.

As depicted, the L2 switch 204D is connected to the L1 switch 204G, and the L2 switch 204E is connected to the L1 switch 204F to enable communications between these switches. The L2 switch 204E may enable communications with L1 switch 204F for transmitting certain transmissions between the servers 214A-214C and/or clients 214D-214E and the various L1 devices 216A-216D. Similarly, the L2 switch 204D may enable communications with L1 switch 204G for transmitting between the servers 214A-214C and/or clients 214D-214E and the various L1 devices 216A-216D. In this regard, the L2 switch 204D and L2 switch 204E may provide redundancy such that if either fails, the other switch will continue to enable communication. Further in this regard, one or both of the L2 switches may enable communication with the L1 switches, for example to receive transmissions associated with and/or communicate transmissions associated with the L1 device set (e.g., collected controller data and/or queries for retrieving such data). Additionally, the networked devices of the L2 device set may provide functionality for controlling, programming, and/or otherwise monitoring one or more of the computing devices 216A-216D in the L1 device set. Further, the switch 204D may be configured to enable communications of transmissions to the L3 device set, for example via router 212 and/or switch 204C for further transmission to the L3.5 device set or higher layer devices (for example, for accessing an enterprise risk system management system 202 and/or external configuration update cloud system).

The L1 switch 204F and L1 switch 204G may similarly provide redundant functionality associated with enabling communications with the computing devices 216A-216D of the L1 device set. In this regard, the L1 switches 204F and 204G may both be communicable with each of the computing devices 216A-216D. The L1 switches 204F and 204G may communicate back with corresponding L2 switches 204E and 204D to enable such communication of transmissions (e.g., query requests) for retrieving certain data from one or more of the computing devices 216A-216D, and/or communication of response data to such transmission including the retrieved and/or otherwise collected data.

The networked devices 216A-216D may each embody specific computing devices, hardware, circuitry, or the like configured for various hardware-layer functionality. For example, computing hardware 216A may include various sub-components, sub-devices, sub-circuitry and/or other hardware for performing functionality associated with a particular task. In an example context of an industrial plant, the computing hardware 216A may include various specially configured hardware associated with one or more devices controlling various machines, robotic devices, and/or the like associated with an industry control system. Similarly, controller 216B may embody one or more machine, robotic device, and/or other hardware controller of various types associated with an industry control system. PLC 216C and PLC 216D may embody a programmable logic controller associated with one or more machines, robotic devices, and/or other hardware of an industry control system.

It should be appreciated that, as depicted, the L2 device set and L1 device set may form a sub-network architecture of the network architecture 200. Specifically, the sub-network architecture may be an internal network architecture embodying and/or associated with an intranet, of the network architecture 200. In this regard, the risk management system 210, alone or in conjunction with one or more other networked devices of the L3 device set, may be able to detect the connections of each networked device associated with the L3 device set or with a lower-layer device set. In the illustrated example, the risk management system 210 may be able to identify a network architecture including the L1 device set and all associated connections, the L2 device set and all associated connections, and optionally the router 212 and/or switch 204C, and/or one or more associated connections. In some embodiments, the risk management system 210 is configured only to identify networked devices at the same device layer and/or at a lower-layer.

Example Apparatus for Implementing Embodiments of the Present Disclosure

The risk management system 210, alone or combined with one or more of the networked devices in the L3 device set, may be embodied by one or more computing systems, such as the apparatus 300. The apparatus 300 may include a processor 302, a memory 304, an input/output module 306, a communications module 308, and a network device management module 310. The apparatus may be configured, using one or more of the components 302, 304, 306, 308, and/or 310, to execute operations for performing the functionality described herein.

Although the components are described with respect to functional limitations, it should be understood that the particular implementations necessarily include the use of particular hardware. It should also be understood that certain of the components described herein may include similar or common hardware. For example, two sets of components, for example two sets of circuitry or modules, may both leverage use of the same processor(s), network interface(s), storage medium(s), or the like to perform their associated functions, such that duplicate hardware is not required for each set of components. The use of the terms "circuitry" and "module" as used herein with respect to components of the apparatus 300 should therefore be understood to include particular hardware configured to perform the functions associated with the particular circuitry or module as described herein.

The term "circuitry" and "module" should be understood broadly to include hardware and, in some embodiments, software for configuring the hardware. For example, in some embodiments, "circuitry" or "module" may include processing circuitry, storage media, network interfaces, input/output devices, and the like. In some embodiments, other elements of the apparatus 300 may provide or supplement the functionality of another particular module. For example, the processor 302 may provide processing functionality, the memory 304 may provide storage functionality, the communications module 308 may provide network interface functionality, and the like.

In some embodiments, the processor 302 (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus 300 to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processor" and the term "processing circuitry" generally may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 302 may be configured to retrieve and/or maintain one or more updated device configurations data object(s), for example from a configuration update cloud system, for example directly or indirectly via communication with one or more higher-layer networked devices. As illustrated in FIG. 2, for example, the processor 302 may be configured for retrieval and maintenance of an updated device configuration set, identifying vulnerable networked device set for a detected networked device set, generating a corresponding device cyber risk score, and identifying various information therefrom. In some embodiments, the processor 302 is alternatively or additionally configured for providing various interfaces corresponding to the data maintained by, and/or processed by, the processor 302.

In some embodiments, the apparatus 300 may include input/output module 306 that may, in turn, be in communication with processor 302 to provide output to the user and, in some embodiments, to receive an indication of a user interaction (e.g., user input). The input/output module 306 may comprise one or more user interface(s) (e.g., a device monitoring interface) and may include a display that may comprise the interface(s) rendered as a web user interface, an application interface, a client device, a backend system, or the like. In some embodiments, the input/output module 306 may also include a keyboard, a mouse, a joystick, a touch screen, touch areas, soft keys, a microphone, a speaker, or other input/output mechanisms. The processor 302 and/or input/output module 306 comprising the processor may be configured to control one or more functions of one or more user interface elements through computer program instructions (e.g., software and/or firmware) stored on a memory accessible to the processor (e.g., memory 304, and/or the like).

The communications module 308 may be any means such as a device or circuitry embodied in either hardware or a combination of hardware and software that is configured to receive data from and/or transmit data to a network, circuitry, module, and/or any other device in communication with the apparatus 300. In this regard, the communications module 308 may include, for example, a network interface for enabling communications with one or more wired or wireless communication network(s). For example, the communications module 308 may include one or more network interface card(s), antenna(s), bus(es), switch(es), router(s), modem(s), and supporting hardware and/or software, or any other device suitable for enabling communications via one or more communication network(s). Additionally or alternatively, the communications module 308 may include circuitry for interacting with the antenna(s) and/or other hardware or software to cause transmission of signals via the antenna(s) or to handle receipt of signals received via the antenna(s).

The network device management module 310 includes hardware, software, or a combination thereof, configured to support functionality of a risk management system 210 in communication with one or more networked devices associated with a particular network architecture. The network device management module 310 may utilizing processing circuitry, such as the processor 302, to perform these actions. The network device management module 310, alone or in conjunction with one or more other modules of the apparatus 300, may include hardware, software, and/or a combination thereof configured to retrieve an updated device configuration, for example from a configuration updated cloud system. Additionally or alternatively, the network device management module 310, alone or in conjunction with one or more other modules of the apparatus 300, may include hardware, software, and/or a combination thereof configured to identify a vulnerable networked device set, for example based at least in part on a detected networked device set and a updated device configurations data object. Additionally or alternatively, the network device management module 310, alone or in conjunction with one or more other modules of the apparatus 300, may include hardware, software, and/or a combination thereof configured to generate a device cyber risk score data object set associated with the vulnerable networked device set, and output the device cyber risk score data object set.

In some embodiments, the network device management module 310, alone or in conjunction with one or more other modules of the apparatus 300, may include hardware, software, and/or a combination thereof configured to identify and/or otherwise derive data based on the device cyber risk score data object set and/or the vulnerable networked device set, for example an update recommendations set. In some embodiments, additionally or alternatively, the network device management module 310, alone or in conjunction with one or more other modules of the apparatus 300, may include hardware, software, and/or a combination thereof configured to cause execution of at least one device update action based on the update recommendations set. Additionally or alternatively, in some embodiments, the network device management module 310, alone or in conjunction with one or more other modules of the apparatus 300, may include hardware, software, and/or a combination thereof configured to provide one or more interfaces associated with the identified, retrieved, and/or derived data. It should be appreciated that, in some embodiments, the network device management module 310 may include a separate processor, specially configured FPGA, or a specially programmed application specific integrated circuit (ASIC).

In some embodiments, it should be appreciated that the one or more of the modules 302-310 may be combined. Alternatively or additionally, in some embodiments, one or more of the modules may perform some, or all, of the functionality described associated with another component. For example, in some embodiments, the modules 310 and 302 may be combined such that processing circuitry is provided to perform the operations described above with respect to each of these components.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware, and/or firmware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus' circuitry to produce a machine, such that the computer, processor, or other programmable circuitry that execute the code on the machine creates the means for implementing various functions, including those described herein.

The computing systems described herein can include client devices and server devices. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described, and will be described below. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example Network Architecture Interface and Risk Related

One or more embodiments disclosed herein may be configured for rendering various interfaces. In this regard, FIGS. 4A and 4B depict example interfaces associated with a detected networked device set, and for rendering information associated with an identified vulnerable networked devices of the networked device set. The interfaces may be rendered by a specially configured risk management system, for example embodied by the apparatus 300.

FIG. 4A illustrates a network architecture analysis interface 400A. The network architecture analysis interface 400A includes various interface elements associated with an identified network architecture. The network architecture may include any number of networked devices communicable with, and identified by, the apparatus 300. For example, it should be appreciated that in some example contexts, the networked device set associated with an apparatus 300 includes tens, hundreds, or even thousands of devices. To facilitate access to interface elements associated with any number of networked devices, the network architecture analysis interface 400A may include a scroll view and a corresponding scroll bar element, or any other expandable interface, that enables a user to navigate the interface for viewing any number of interface elements.

The network architecture analysis interface 400A may include a networked device interface element for each identified network device. For example, as illustrated, the network architecture analysis interface 400A includes networked device interface elements 402A-402J (collectively "networked device interface elements 402"). Each of the networked device interface elements 402 may be linked to one of the identified networked devices, for example such that the networked device interface element renders information based on the linked networked device. In a particular embodiment, for example, each of the networked device interface elements 402 may include one or more sub-elements embodying a representation of various identifiers associated with the linked networked device including, without limitation, (1) an Internet protocol (IP) address, (2) a media access control (MAC) address, (3) a device identifier, (4) a device name, and/or the like, or any combination thereof). Additionally or alternatively, each of the networked device interface elements 402 may include one or more sub-elements embodying a representation of various descriptive elements associated with the linked networked device including, without limitation, (1) a networked device type, (2) various software, hardware, and/or firmware configurations and/or versions, (3) device connectivity data, and/or the like, or any combination thereof. In this regard, each networked device interface element may include various sub-interface elements that may be used to identify the networked device that corresponds to the networked device interface element. It should be appreciated that each networked device interface element may be customized to include any information that may be retrievable and/or otherwise identified, for example by the apparatus 300, associated with the corresponding networked device.

FIG. 4B illustrates a vulnerable device analysis interface 400B. The vulnerable device analysis interface 400B includes various interface elements associated with an identified vulnerable networked device set. The vulnerable networked device set may be identified, for example by the apparatus 300, after initiation of one or more of the operations and/or processes described herein with respect to automatic network architecture configuration maintenance. For example, in some embodiments, the vulnerable networked device set may be identified upon a network audit initiated automatically (e.g., a monthly network audit) or upon user interaction indicating request of a network audit. It should be appreciated that the vulnerable networked device set may include any number of networked devices up to the identified number of network devices in the network architecture. To facilitate access to vulnerable device interface elements associated with any number of networked devices, the vulnerable device analysis interface 400B may include a scroll view and a corresponding scroll bar element, or any other expandable interface, that enables a user to navigate the interface for viewing any number of interface elements.

The vulnerable device analysis interface 400B may include a vulnerable network device interface element for each identified vulnerable networked device. For example, as illustrated, the vulnerable device analysis interface includes vulnerable network device interface elements 404A-404D (collectively "vulnerable networked devices 404"). Each vulnerable network device interface element may be linked to one of the identified vulnerable networked devices, for example, such that the device interface element renders information based on the linked vulnerable networked device. Particularly, the vulnerable network device interface element for a particular vulnerable networked device indicates to a user that the vulnerable networked device is associated with at least one identified configuration vulnerability.

The vulnerable device analysis interface 400B may include a variety of information associated with the vulnerable networked device and/or identified configuration vulnerability. For example, in some embodiments, each of the vulnerable networked device interface elements 404 includes a sub-interface element representing a vulnerability identifier and/or vulnerability description that may be analyzed to determine the identified vulnerability (e.g., a software package name and/or identifier that is outdated, or a hardware component name that has become obsolete or associated with a vulnerability). Additionally or alternatively, in some embodiments, each of the vulnerable networked device interface elements 404 includes a sub-interface element representing a device cyber risk score data object associated with each identified configuration vulnerability. It should be appreciated that device cyber risk score data objects may be represented in any of a number of ways, for example numerically based on an enclosed range (e.g., 0 to 5, 0 to 100), numerically based on an open range (e.g., 0 to infinity), categorically (e.g., risky/not risky, low/medium/high risk, or the like), and the like, or in any combination thereof. Additionally or alternatively, in some embodiments, each of the vulnerable networked device interface elements 404 includes a sub-interface element represent a device cyber risk priority data object associated with each identified configuration vulnerability. It should similarly be appreciated that device cyber risk priority data objects may be represented in any of a number of ways, for example numerically based on an enclosed range or an open range, categorically, using an encoding scheme or image scheme (e.g., red for high priority, yellow for medium priority, and green for low priority, or the like), and the like, or any combination thereof. In some embodiments, each device cyber risk priority data object corresponding to an identified configuration vulnerability may be based on and/or otherwise associated with the device cyber risk score data object for the identified configuration vulnerability. For example, in some embodiments, a particular subset of device cyber risk score data objects may be associated with a first device cyber risk priority data object, a second subset of device cyber risk score data objects may be associated with a second cyber risk score priority data object, a third subset of device cyber risk score data objects may be associated with a third cyber risk score priority data object, and so on. In the example context of numerical device cyber risk score data objects, for example, a device cyber risk priority data object representing a low priority may be associated with device cyber risk score data objects having a value of 0-33, a device cyber risk priority data object representing a medium priority may be associated with device cyber risk score data objects having a value of 34-66, and a device cyber risk priority data object representing a high priority may be associated with device cyber risk score data objects having a value of 67-100. It should be appreciated that any number of priorities may be used, and each priority may be associated with any range and/or value set for device cyber risk score data objects.

In some embodiments, the vulnerable device analysis interface 400B may be configured for user interaction with one or more of the interface elements therein. For example, in some embodiments, each of the vulnerable device interface elements may be configured to receive user interaction. It should be appreciated that the user interaction may include one or more of a touch, a tap, a gesture, a voice command, a keystroke, a mouse click, a peripheral engagement, and/or one or more user interactions with an associated device. Each user interaction may include user interaction data that may be parsed and/or otherwise processed to identify the vulnerable device interface element and/or corresponding vulnerable networked device with which the user interaction is associated.

The user may, in at least one example context, interact with one of the vulnerable device interface elements 404 to indicate a desire to initiate one or more actions associated with resolving the identified configuration vulnerability. For example, in some embodiments, the apparatus 300 may identify one or more update recommendations associated with each identified configuration vulnerability. Each update recommendation may be associated with one or more device update actions that, upon initiation, may resolve the identified configuration vulnerability. For example, by interacting with one of the vulnerable device interface elements 404, the user may cause the associated vulnerable networked device to initiate an update of one or more configurations. In a particular example context, such updates may include software updates, firmware updates, BIOS updates, and/or the like, to match an identified updated configuration.

Example Operations Performed by Embodiments of the Present Disclosure

It should be appreciated that, in some embodiments, the operations of the flowcharts, or a combination of the operations herein, may form a computer-implemented method. Further, in some embodiments, an apparatus (such as the apparatus 300) may be caused or otherwise configured to perform the computer-implemented method via various means, including computer-coded instructions stored to a memory of the apparatus and available to a processor for execution. In some embodiments, a non-transitory computer-readable storage medium is configured to store computer program code that, when executed by processing circuitry (such as a processor of a device, system, or apparatus) is configured to perform and/or execute the operations described.

The operations depicted with respect to the flowcharts herein may include one or more optional blocks. Each optional block may be depicted in dashed (or "broken") lines in one or more flow diagrams illustrated herein. It should be appreciated that such optional blocks are optional for purposes of the depicted embodiment. Indeed, in some embodiments, all optional blocks may not be included, while in other embodiments all optional blocks may be included. In yet other embodiments, some, but not all, of the optional blocks depicted may be included.

Figure 5:
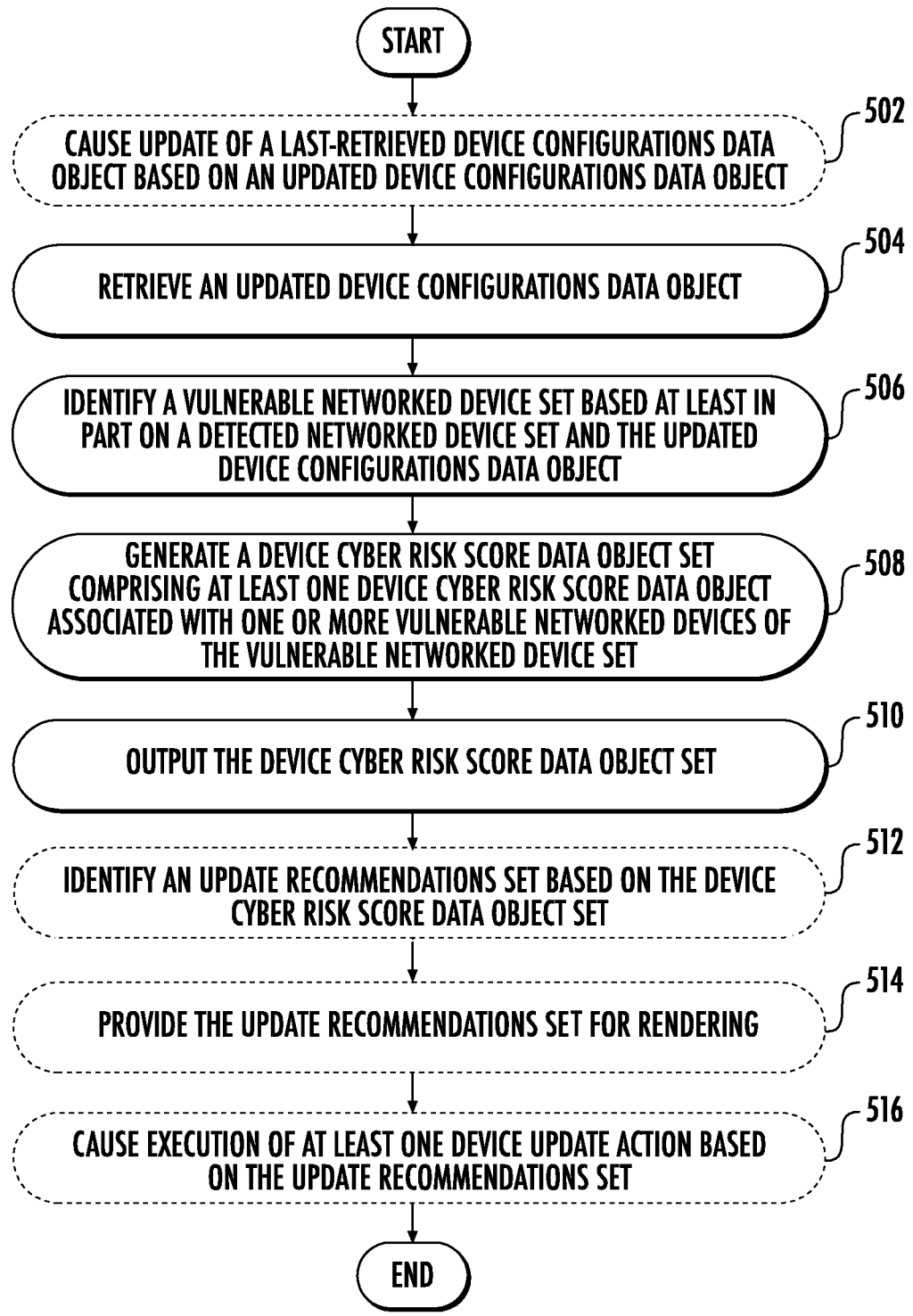

FIG. 5 illustrates a flowchart depicting example operations for automatic network architecture configuration maintenance, in accordance with at least some example embodiments of the present disclosure. In this regard, in some embodiments, the operations depicted are performed by a specially configured risk management system, for example embodied by the apparatus 300. The apparatus 300 may be in communication with one or more networked devices forming a network architecture associated with the apparatus 300. Additionally or alternatively, the apparatus 300 may be in communication with a configuration update cloud system. In some embodiments, the apparatus 300 may be configured to communicate with one or more higher-layer devices for indirectly communicating with the configuration update cloud system, for example through one or more firewall(s), proxy system(s), and/or enterprise risk management system(s).

The depicted process begins at optional block 502. At optional block 502, the apparatus 300 includes means, such as the network device management module 310, communications module 308, input/output module 310, processor 302, and/or the like, or a combination thereof, configured to cause update of a last-retrieved device configurations data object based on an updated device configurations data object. In some embodiments, for example, the apparatus 300 may cause another system or device configured to store a last-retrieved device configurations data object, such as an enterprise risk management system, to update the last-retrieved device configurations data object by retrieving an up-to-date device configuration data object from an external cloud system, for example a configuration update cloud system. In this regard, the last-retrieved device configurations data object may be updated to include all up-to-date configuration data for one or more networked devices of one or more networked device types. In some embodiments, the apparatus 300 causes another system or device, such as the enterprise management system, to store the updated device configurations data object as the newly updated last-retrieved device configurations data object.

In some embodiments, the apparatus 300 includes means configured to cause update of the last-retrieved device configurations data object automatically. For example, in some embodiments, the apparatus 300 is configured to cause update of the last-retrieved device configurations data object at a defined timestamp interval (e.g., every day, every week, every month, or the like). It should be appreciated that, in some such embodiments, the apparatus 300 may include means configured to function as a timer for determining whether to cause such an update, for example by tracking a timestamp interval since the last update. In other embodiments, the apparatus 300 includes means to cause update of the last-retrieved device configurations data object based on the updated device configurations data object in response to receiving user interaction indicating a request to update the last-retrieved device configurations data object. In some embodiments, the apparatus 300 may render one or more interfaces configured to receive such user interaction (for example, including a button for updating the last-retrieved device configurations data object).

At block 504, the apparatus 300 includes means, such as the network device management module 310, communications module 308, input/output module 310, processor 302, and/or the like, or a combination thereof, configured to retrieve an updated device configurations data object. The updated device configurations data object may include various information identifying up-to-date configurations for various networked devices and/or networked device types.

For example, the updated device configurations data object may include up-to-date hardware, software, and/or firmware configurations for various networked device types. The networked device types may include various servers of different types (e.g., application servers, database servers, client servers, proxy servers, and/or the like), switches of different types, client devices of different types, programmable logic controllers, hardware controllers, and/or other computing hardware. In some embodiments, for example, the updated device configurations data object may be embodied by one or more files containing structured data embodying the up-to-date configuration information. In a particular example context, the updated device configurations data object is embodied by a XML file structured based on the various networked device types. The apparatus 300 may be configured to parse and/or otherwise identify, from the updated device configurations data object, updated configuration data for a particular network device.

In some embodiments, the apparatus 300 is configured to retrieve the updated device configurations data object communications with a proxy system and/or an enterprise risk management system. For example, the apparatus 300 may be configured to communicate with the proxy system to facilitate secure communications with the enterprise risk management system. The enterprise risk management system may be configured to update a last-retrieved device configurations data object by retrieving the updated device configurations data object from the configuration update cloud system. In some such example contexts, the apparatus 300 may have caused the enterprise risk management system to update the last-retrieved device configurations data object, for example to represent the most up-to-date updated device configurations data object at defined time intervals. The apparatus 300 may, by transmitting a request to the enterprise risk management system and receiving a response including the last-retrieved device configurations data object representing the last retrieved updated device configurations data object, retrieve the last-retrieved device configurations data object. In this regard, the apparatus 300 retrieves the updated device configurations data object indirectly from the configuration update cloud system through the enterprise risk management system. In other embodiments, the updated device configurations data object is retrieved directly from a configuration update cloud system, for example by communications with a proxy system communicable with the apparatus 300 and configuration update cloud system.

At block 506, the apparatus 300 includes means, such as the network device management module 310, communications module 308, processor 302, and/or the like, or a combination thereof, configured to identify a vulnerable networked device set based at least in part on a detected networked device set and the updated device configurations data object. In some such embodiments, the apparatus 300 may be configured to identify the detected networked device set comprising at least one networked device communicable with the apparatus 300. In some such embodiments, the detected networked device set embodies a network architecture associated with the apparatus 300. The networked device set may, in some contexts, includes networked devices of a layer equal to and/or lower than the device layer associated with the apparatus 300. For example, where the apparatus 300 embodies a L3 networked device, the detected networked device set may include L2 and/or L1 networked devices in some embodiments, or L3, L2, and/or L1 networked devices in other embodiments.

In some embodiments, the apparatus 300 further includes means configured to retrieve current configuration data associated with each networked device of the detected networked device set. In this regard, the apparatus 300 may retrieve current configuration data embodying the current versions of hardware, software, and/or firmware associated with the networked device. The current configuration data for each networked device may be stored to a datastore maintained by the apparatus 300. For example, the apparatus 300 may store the current configuration data associated with a device identifier for the networked device with which the current configuration data is linked. In this regard, the apparatus 300 may update the datastore to include current configuration data for each networked device of the detected networked device set. The current configuration data for a particular networked device may be compared with corresponding up-to-date configuration data of the updated configuration data object to determine whether the networked device is associated with a configuration vulnerability and thus vulnerable, for example as described below with respect to FIG. 9. The vulnerable networked device set may include at least one networked device associated with at least one configuration vulnerability (e.g., a vulnerable networked device).

In some embodiments, the apparatus 300 utilizes any combination of a variety of networked device detection algorithms and/or software implementations. For example, in some embodiments, the apparatus 300 utilizes one or more customized networked device detection algorithms and/or software implementations for identifying the networked device set and/or retrieving the current configuration data from each networked device of the networked device set. Alternatively or additionally, in some embodiments, the apparatus 300 is configured to utilize one or more known software applications for identifying the networked device set and/or retrieving the current configuration data from each networked device of the networked device set. For example, the apparatus 300 may include means configured to utilize, without limitation, one or more of Microsoft Corp.'s PowerShell™, Windows™ Management Instrumentation ("WMI"), Dell Inc's OpenManage™ Server Administrator ("OMSA"), OpenManage™ Client Instrumentation ("OMCI"), one or more Simple Network Management Protocol ("SNMP") agent(s), one or more Open Platform Communications (for example, Object Linking and Embedding for Process Control) ("OPC") Agent(s), and/or the like. In this regard, for example, the apparatus 300 may retrieve current configuration data using one or more SNMP agents for one or more switch devices, one or more OPC agents for one or more programmable logic controller or other controllers (including third-party controllers and/or off-the-shelf controller devices), and/or other L1 networked devices, and/or one or a combination of OMSA and OMCI fetching mechanisms for one or more server devices, client devices, and/or other personal computing devices.

At block 508, the apparatus 300 includes means, such as the network device management module 310, processor 302, and/or the like, or a combination thereof, configured to generate a device cyber risk score data object set associated with the vulnerable networked device set. The device cyber risk score data object set includes one or more cyber risk score data object associated with one or more vulnerable networked device of the vulnerable networked device set. For example, in some embodiments, each vulnerable networked device may be associated with a device cyber risk score data object subset comprising one or more device cyber risk score data object(s) for each configuration vulnerability identified for the vulnerable networked device.

Each cyber risk score data object may represent a determined level of risk associated with a configuration vulnerability identified associated with particular configuration data. For example, a cyber risk score data object may indicate that a configuration vulnerability was identified for current configuration data is outdated based on the updated device configurations data object, and/or that the configuration vulnerability is known to be associated with one or more cyberattacks. In this regard, the cyber risk score data object may represent a value indicating the likelihood that configuration vulnerability may be exploited by a cybersecurity attack or other threat. Additionally or alternatively, the cyber risk score data object may represent a value indicating the severity of a cybersecurity attack associated with the configuration vulnerability.

The apparatus 300 may include means configured to generate the device cyber risk score data object set using one or more risk determination algorithms. It should be appreciated that the risk determination algorithm(s) may utilize various factors to generate a corresponding device risk score data object. For example, in some embodiments, the device risk score data object for a particular configuration vulnerability is generated based on, without limitation, (1) historical data for cyberattacks corresponding to the configuration vulnerability (e.g., configuration vulnerabilities associated with more than a threshold number of attacks, or otherwise determined to be common, are associated with values indicating greater risk), (2) severity data associated with cyberattacks corresponding to the configuration vulnerability (e.g., configuration vulnerabilities associated with greater network access, greater data access, and/or access to secure information, or configuration vulnerabilities posing a threat to significant plant operations, are associated with values indicating greater risk), and (3) vulnerability difficulty data (e.g., security vulnerabilities requiring physical access to secure hardware associated with values indicating lesser risk, and configuration vulnerabilities associated with remote cyberattacks associated with values indicating greater risk) or any combination thereof. The apparatus 300 may be configured to retrieve any such data from one or more external systems, receive any such data from one or more external systems, and/or receive user interaction representing any such data, and store the data in one or more datastores for retrieval and use with one or more risk determination algorithm(s). It should be appreciated that, in some embodiments, one or more risk determination algorithm(s) may utilize other factors associated with data stored by and/or accessible to the apparatus 300.

Further, it should be appreciated that the each device cyber risk score data object may be represented in any of a number of manners. For example, in some embodiments, the device cyber risk score data object may represent a numerical value within a defined range (e.g., 0 to 5, 0 to 100, or the like), where values closer to the greater bound represent greater risk (or in other embodiments, where values closer to the lower bound represent greater risk). In other embodiments, the device cyber risk score data object may represent a categorical value within a defined set of values (e.g., low risk/medium risk/high risk, very low risk/low risk/medium risk/high risk/very high risk, or the like). It should be appreciated that, in yet other embodiments, various device cyber risk score data objects within a device cyber risk score data object set may include values represented by a combination of types, which may include one or more of the above-mentioned types.

At block 510, the apparatus 300 includes means, such as the network device management module 310, communications module 308, input/output module 306, processor 302, and/or the like, or a combination thereof, configured to output the device cyber risk score data object set. In some embodiments, the device cyber risk score data object set is output to one or more modules of the apparatus 300 for further processing. In other embodiments, the apparatus 300 outputs the device cyber risk score data object set for rendering. In some embodiments, the apparatus 300 is configured to output the device cyber risk score data object set to another device, system, or the like for further processing and/or rendering. For example, the apparatus 300 may output the device cyber risk score data object set to another networked system, or to a client device utilized by a user for accessing functionality of the apparatus 300.

In some embodiments, the device cyber risk score data object set is output along with the corresponding identified configuration vulnerabilities for each vulnerable networked device. Additionally or alternatively, in some embodiments, the device cyber risk score data object set is output with a device cyber risk priority data object set and/or other data associated with, and/or derived from, the device cyber risk score data object set. It should be appreciated that, in other embodiments, any combination of data associated with a vulnerable networked device may be output for further processing and/or rendering.

At optional block 512, the apparatus 300 includes means, such as the network device management module 310, communications module 308, input/output module 306, processor 302, and/or the like, or a combination thereof, configured to identify an update recommendations set based on the vulnerable networked device set. The update recommendations set may include information, such as product data, user readable description data, and/or computer-executable instructions associated with resolving the configuration vulnerabilities linked to each particular vulnerable networked device. For example, the update recommendations set may include user-readable descriptions associated with one or more device update actions that a user may desire to execute based on the identified configuration vulnerabilities. In some embodiments, the apparatus 300 may identify the update recommendations set from a database maintained by or accessible to the apparatus 300. Alternatively or additionally, in some embodiments, the apparatus 300 may identify the update recommendations set from the updated device configurations data object. For example, the updated device configurations data object may include update recommendation information associated with each device configuration data represented in the updated device configurations data object.

At optional block 514, the apparatus 300 includes means, such as the network device management module 310, communications module 308, input/output module 306, processor 302, and/or the like, or a combination thereof, configured to provide the update recommendations set for rendering. In some embodiments, the apparatus 300 may provide the update recommendations set for rendering to a display associated with the apparatus 300. In this regard, in some embodiments, the apparatus 300 may transmit signals representing the update recommendations set to the display to cause rendering of an interface comprising the update recommendations set. Alternatively or additionally, in some embodiments, the apparatus 300 is configured to provide the update recommendations set for rendering by transmitting the update recommendations set to another system and/or device for rendering to a display associated with that system and/or device. For example, in some embodiments, the apparatus 300 provides the update recommendations set for rendering by transmitting the update recommendations set to a client device to cause rendering of the update recommendations set to a display associated with the client device, such as where the client device is associated with a user accessing the functionality of apparatus 300.

At optional block 516, the apparatus 300 includes means, such as the network device management module 310, communications module 308, processor 302, and/or the like, or a combination thereof, configured to cause execution of at least one device update action based on the update recommendations set. In some embodiments, for example, the apparatus 300 may receive user interaction data, where the user interaction data indicates selection of one or more update recommendations based on user interaction with one or more rendered interfaces. In some embodiments, the apparatus 300 may be configured to retrieve a stored computer-executable instructions set associated with one or more configuration vulnerability and/or configuration data, or to retrieve a computer-executable instructions set associated with the one or more configuration vulnerability and/or configuration data. For example, the computer-executable instructions set may be executed by the apparatus 300 to cause transmission of one or more signals, requests, or other data to a vulnerable networked device associated with the update recommendation, where the transmission causes the vulnerable networked device to execute a corresponding device update action based on the transmission. For example, in some embodiments, the computer-executable instructions set may represent a remote procedure call, or request including one or more specific data objects and/or identifiers configured to cause execution of a particular corresponding device update action. In some such embodiments, the device update action may comprise one or more steps for updating the vulnerable device configuration to match an up-to-date device configuration.

Figure 6:
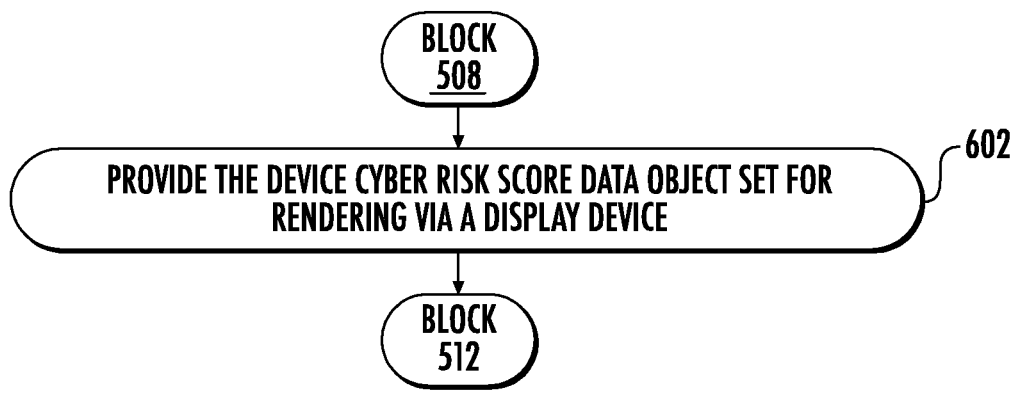

FIG. 6 illustrates another flowchart depicting additional example operations for automatic network architecture configuration maintenance, specifically to output the cyber risk score data object set in accordance with at least some example embodiments of the present disclosure. In this regard, in some embodiments, the operations depicted are similarly performed by the specially configured risk management system, for example embodied by the apparatus 300. The process depicted in FIG. 6 begins at block 602. In some embodiments, the block 602 may begin after one or more blocks of the process depicted with respect to FIG. 5, and/or is performed additional to and/or alternative to one or more blocks depicted with respect to FIG. 5. In an example context, the process may begin after execution of block 508, and/or may be performed as block 510, such that flow returns to block 512 after execution of the operations depicted with respect to FIG. 6.

At block 602, the apparatus 300 includes means, such as the network device management module 310, communications module 308, input/output module 306, processor 302, and/or the like, or a combination thereof, configured to provide the device cyber risk score data object set for rendering via a display device. In some embodiments, the display device is associated with the apparatus 300. In other embodiments, the display device is associated with another system and/or device, for example a client device used by the user to access functionality associated with the apparatus 300. In this regard, in some embodiments, the apparatus 300 may transmit signals representing the device cyber risk score data object set to the display to cause rendering of an interface comprising at least the device cyber risk score data object set. Additionally or alternatively, in some embodiments, the apparatus 300 is configured to provide the device cyber risk score data object set for rendering by transmitting one or more transmissions and/or other network data representing the device cyber risk score data object set to the other system and/or device for rendering.

It should be appreciated that, in some embodiments, the device cyber risk score data object set may be rendered to one or more interfaces together with other data objects and/or information. For example, in some embodiments, the device cyber risk score data object set may be provided together with a device cyber risk priority data object set, as described herein. Alternatively or additionally, in some embodiments, the device cyber risk score data object set may be provided together with an update recommendations set. In some such embodiments, a single interface may be rendered including all data that may be useful to a user for decision-making purposes regarding whether to update a device configuration corresponding to each device risk score data object.

Figure 7:
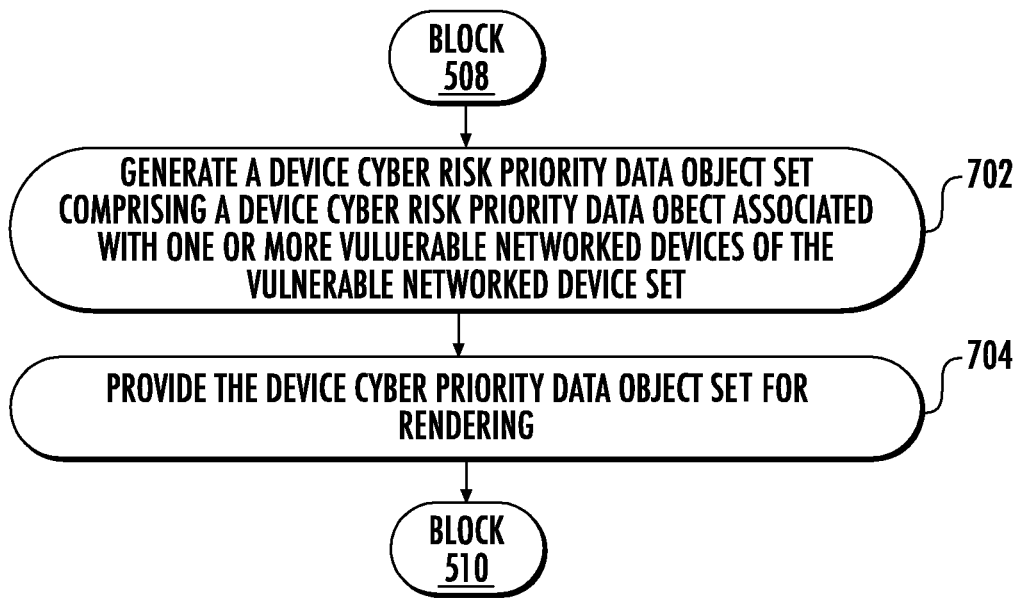

FIG. 7 illustrates another flowchart depicting additional example operations for automatic network architecture configuration maintenance, in accordance with at least some example embodiments of the present disclosure. In this regard, in some embodiments, the operations depicted are similarly performed by the specially configured risk management system, for example embodied by the apparatus 300. The process depicted in FIG. 7 begins at block 702. In some embodiments, the block 702 may begin after one or more blocks of the process depicted with respect to FIG. 5, and/or is performed additional to and/or alternative to one or more blocks depicted with respect to FIG. 5. In an example context, the process may begin after execution of block 508, such that flow returns to block 510 after execution of the operations depicted with respect to FIG. 7.

At block 702, the apparatus 300 includes means, such as the network device management module 310, processor 302, and/or the like, or a combination thereof, configured to generate a device cyber risk priority data object set comprising a device cyber risk priority data object associated with one or more vulnerable networked devices of the vulnerable networked device set. The device cyber risk priority data object set may include one or more device cyber risk priority data object(s). Each device cyber risk priority data object may be associated with and/or otherwise linked to a particular configuration vulnerability identified corresponding to a particular vulnerable networked device. In this regard, each networked device may indirectly be associated with any number of device cyber risk priority data object(s) based on the identified configuration vulnerabilities for the vulnerable networked device.

Each cyber risk score priority data object may represent a determined importance of resolving the corresponding configuration vulnerability identified associated with particular configuration data of the corresponding vulnerable networked device. For example, the cyber risk score priority data object may be indicate to a user and/or system whether a configuration vulnerability may pose a risk of a substantial cybersecurity attack. In this regard, the cyber risk priority data object may be processed and/or otherwise analyzed, for example by a system or user, in determining when to resolve a configuration vulnerability.

In some embodiments, the apparatus 300 may include means configured to generate the device cyber risk priority data object set using one or more priority determination algorithms. It should be appreciated that the priority determination algorithm(s) may utilize various factors to generate a corresponding device risk score data object. In some such embodiments, the factors user by a priority determination algorithm may be the same as a corresponding risk determination algorithm. In other embodiments, the priority determination algorithm(s) may utilize different factors. For example, in some embodiments, the device cyber risk priority data object set may include values indicating the priority of resolving a configuration vulnerability based on the likely severity of a successful cyberattack associated with the configuration vulnerability, and be based only (or heavily, e.g., associated with a particular weight above a particular threshold) on severity data. Alternatively, in some embodiments, the device cyber risk priority data object set may include values indicating the likely the priority of resolving a configuration vulnerability based on the likelihood of a cyberattack occurring that leverages the configuration vulnerability, and be based only (or heavily) on historical data for cyberattacks corresponding to the configuration vulnerability. In some embodiments, the priority determination algorithm(s) may generate the device cyber risk priority data object based on a weighted average of various factors associated with various data. In yet other embodiments, the apparatus 300 may generate the device cyber risk priority data object set based on the device cyber risk score data object set, such that each device cyber risk priority data object associated with an identified configuration vulnerability is generated based on a corresponding device cyber risk score data object for the identified configuration vulnerability.

Similar to the device cyber risk score data object set, it should be appreciated that each device cyber risk priority data object may be represented in any of a number of manners. For example, in some embodiments, the device cyber risk score data object may represent a numerical value within a defined range, where the values closer to the greater bound represent a higher priority (or in other embodiments, where values closer to the lower bound represent a higher priority). In other embodiments, the device cyber risk priority data object may represent a categorical value within a defined set of values, for example between low priority and high priority or between very low priority and very high priority). In yet other embodiments, the device cyber risk priority data object may represent an encoded value. For example, in some embodiments, a color may be assigned to each priority level, for example green assigned to low priority, yellow assigned to medium priority, and red assigned to high priority. It should be appreciated that, in yet other embodiments, various device cyber risk priority data objects within a device cyber risk priority data object set may include values represented by a combination of types, which may include one or more of the above-mentioned types.

In a particular example context, the device cyber risk priority data object for each identified configuration vulnerability is based on the device cyber risk score data object associated with the identified configuration vulnerability. For example, in some embodiments where each device cyber risk score data object includes a numerical value, various ranges of numerical values may be associated with different device cyber risk priority data object values. In some embodiments where each device cyber risk score data object includes a categorical value, each categorical value may be associated with a different device cyber risk priority data object value, or in some embodiments each device cyber risk priority data object value may be associated with various device cyber risk score data object values. In an example context, for example, device cyber risk score data objects having a score value of low risk and/or very low risk may be associated with priority value of low priority, device cyber risk score data objects having a score value of medium risk and/or high risk may be associated with a priority value of medium priority, and device cyber risk score data objects having a score value of very high risk may be associated with a priority value of high priority.

It should be appreciated that the apparatus 300 may utilize the device cyber risk priority data object set in any of a number of ways. In some embodiments, for example, the apparatus 300 may utilize the device cyber risk priority data object set for rendering. Additionally or alternatively, in some embodiments, the apparatus 300 may utilize the device cyber risk priority data object set for additional processing and/or determination actions. For example, in some embodiments, the apparatus 300 may only provide update recommendations associated with identified configuration vulnerabilities that correspond to a cyber risk priority data object associated with a value above a certain threshold or within a certain set of values (for example, values representing a priority level above low, or values representing only a high priority and/or very high priority).

In this regard, at optional block 704 for example, the apparatus 300 includes means, such as the network device management module 310, communications module 308, input/output module 306, processor 302, and/or the like, or a combination thereof, configured to provide the device cyber risk priority data object set for rendering, for example to a display device. In some embodiments, the display device is associated with the apparatus 300. In other embodiments, the display device is associated with another system and/or device, for example a client device used by a user to access functionality associated with the apparatus 300. In this regard, in some embodiments, the apparatus 300 may transmit signals representing the device cyber risk priority data object set to the display to cause rendering of an interface comprising at least the device cyber risk priority data object set. Additionally or alternatively, in some embodiments, the apparatus 300 is configured to provide the device cyber risk priority data object set for rendering by transmitting one or more transmissions and/or other network data representing the device cyber risk priority data object set to the other system and/or device for rendering.

It should be appreciated that, in some embodiments, the device cyber risk priority data object set may be rendered to one or more interfaces together with other data objects and/or information. For example, in some embodiments, the device cyber risk priority data object set may be provided together with a device cyber risk score data object set, as described above. Alternatively or additionally, in some embodiments, the device cyber risk priority data object set may be provided together with an update recommendations set. In some such embodiments, a single interface may be rendered including all data that may be useful to a user for decision-making purposes regarding whether to update a device configuration corresponding to each device risk priority data object.

Figure 8:
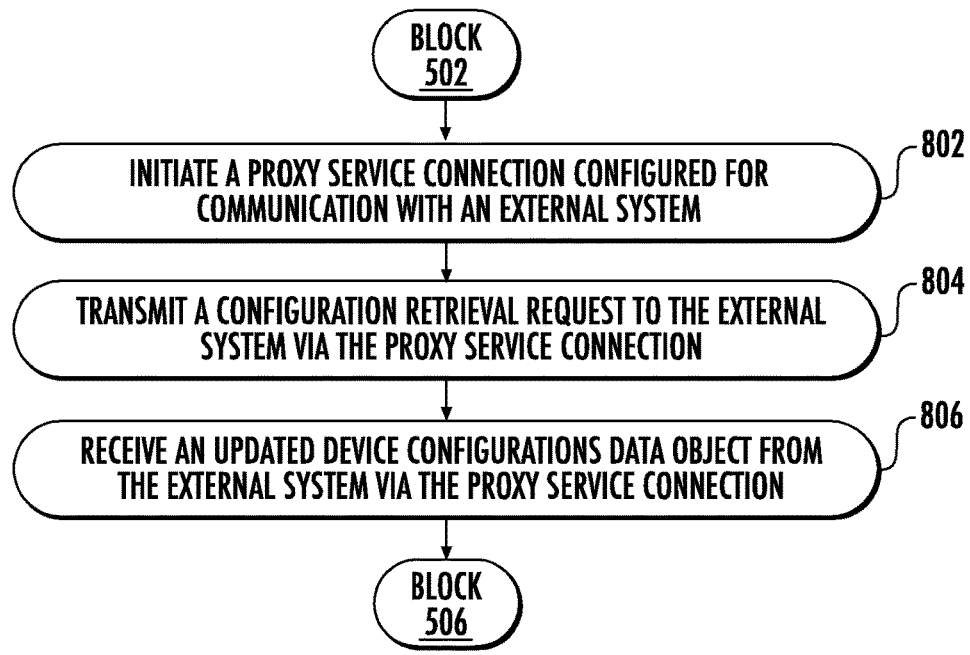

FIG. 8 illustrates another flowchart depicting additional example operations for automatic network architecture configuration maintenance, specifically to output the cyber risk score data object set in accordance with at least some example embodiments of the present disclosure. In this regard, in some embodiments, the operations depicted are similarly performed by the specially configured risk management system, for example embodied by the apparatus 300. The process depicted in FIG. 8 begins at block 802. In some embodiments, the block 802 may begin a process for automatic network architecture configuration maintenance, while in other embodiments the block 802 may begin after one or more blocks of the process depicted with respect to FIG. 5. Additionally or alternatively, in some embodiments, the process depicted in FIG. 8 is performed in addition to and/or alternative to one or more blocks depicted with respect to FIG. 5. In an example context, the process may begin after execution of optional block 502, and/or may be performed as block 504, such that flow returns to block 506 after execution of the operations described with respect to FIG. 8

At block 802, the apparatus 300 includes means, such as the network device management module 310, communications module 308, processor 302, and/or the like, or a combination thereof, configured to initiate a proxy service connection configured for communication with an external system. In some embodiments, the apparatus 300 may be configured to communicate with a proxy system to initiate the proxy service connection. For example, the apparatus 300 may be configured to generate and/or transmit a proxy initiation request to a proxy system communicable with the apparatus 300. The proxy initiation request may include device identification information, for example and without limitation, an IP address, hostname, or other identifier, associated with the external system with which the apparatus 300 will communicate. In other embodiments, the proxy initiation request may cause the proxy system to identify the device identification information associated with the external system for use in establishing the proxy service connection. It should be appreciated that the proxy system may be embodied by one or more physical devices and/or virtual devices. The proxy service connection may be configured to enable retrieving data from and/or transmitting data to the external system without exposing the apparatus 300, and/or any associated networked devices, to direct communications with any external system, device, server, or the like.

The external system may be embodied by one or more virtual devices or physical devices, or a combination thereof, located remotely or otherwise in the cloud with respect to the apparatus 300 and configured for storing data representing an updated device configurations data object. For example, in some embodiments, the external system may embody a configuration update cloud system communicable with the apparatus 300, either directly or indirectly. In other embodiments, the external system may embody an enterprise risk management system communicable with the apparatus 300. The updated device configurations data object may include various device configuration data associated with one or more networked device types, such that the device configuration data for a networked device, having a particular networked device type, may be utilized to identify vulnerable configurations associated with the networked device.

At block 804, the apparatus 300 includes means, such as the network device management module 310, communications module 308, input/output module 306, processor 302, and/or the like, or a combination thereof, configured to transmit a configuration retrieval request to the external system via the proxy service connection. In some embodiments, the apparatus 300 is configured to utilize such means to generate the configuration retrieval request for transmission. In some embodiments, for example where the external system embodies an enterprise risk management system, the configuration retrieval request is transmitted to the external system via the proxy service connection to cause the external system to provide a last-retrieved device configurations data object stored by the external system. The last-retrieved device configurations data object may represent the most up-to-date updated device configurations data object retrieved by the enterprise risk management system. In this regard, the last-retrieved device configurations data object may be updated by the external system (e.g., the enterprise risk management system) at pre-defined time intervals. In some embodiments, the external system may update the last-retrieved device configurations data object to represent a newly up-to-date updated device configurations data object upon receiving the configuration retrieval request. For example, in a circumstance where the external system is embodied by an enterprise risk management system, the enterprise risk management system may communicate with a configurations update cloud system to update the last-retrieved device configurations data object to represent the updated device configurations data object.

In some such embodiments, to transmit the configuration retrieval request via the proxy service connection, the apparatus 300 is configured to indirectly transmit the configuration retrieval request via the proxy system associated with the proxy service connection. In this regard, the proxy system may securely transmit the configuration retrieval request to the external system without exposing information regarding the apparatus 300. In such embodiments, the apparatus 300 remains unexposed to direct communications with the external system and/or one or more other external systems or devices. The apparatus 300 may remain associated with an internal network architecture, for example comprising at least the identified networked device set, securely separated from a public connection.

At block 806, the apparatus 300 includes means, such as the network device management module 310, communications module 308, processor 302, and/or the like, or a combination thereof, configured to receive the updated device configurations data object from the external system via the proxy service connection. In some example embodiments where the external system is the enterprise risk management system, the external system may retrieve a stored last-retrieved device configurations data object representing the updated device configurations data object, and transmit the last-retrieved device configurations data object to the apparatus 300 as response data to the request transmitted by the apparatus 300 at an earlier block. In this regard, the apparatus 300 may receive response data embodying and/or including the updated device configurations data object. In some such embodiments, the apparatus 300 may parse and/or otherwise extract the updated device configurations data object from the response data.

To receive the updated configuration data object via the proxy service connection, the apparatus 300 may communicate with a proxy system associated with the proxy service connection to receive the updated device configurations data object indirectly from the external system. For example, the updated configuration data object may receive the updated device configurations data object from the proxy system in response to a request earlier transmitted via the proxy system, for example in response to the configuration retrieval request transmitted at block 804 via the proxy system. In this regard, it should be appreciated that the proxy service connection may comprise one or more proxy system(s) such that communications are transmitted to the intended recipient indirectly through the one or more proxy system(s), and/or received from a sender system indirectly through the one or more proxy system(s).

Figure 9:
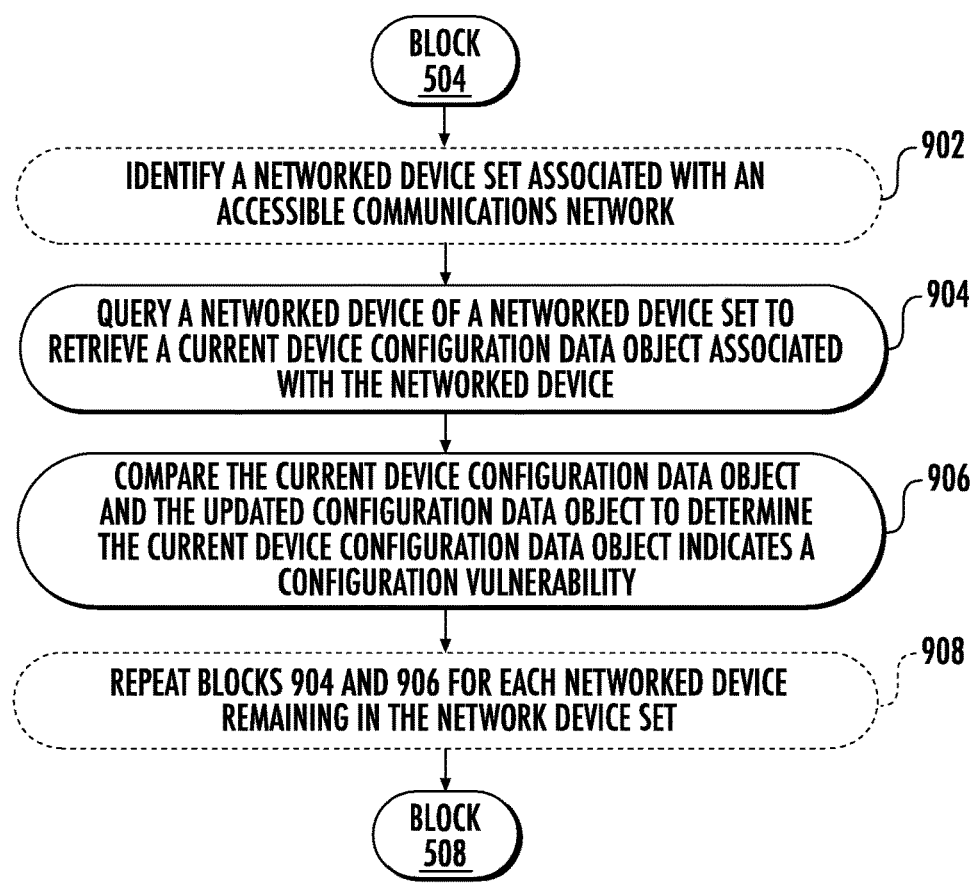

FIG. 9 illustrates another flowchart depicting additional example operations for automatic network architecture configuration maintenance, specifically to identify a vulnerable network device in accordance with at least some example embodiments of the present disclosure. In this regard, in some embodiments, the operations depicted are similarly performed by the specially configured risk management system, for example embodied by the apparatus 300. The process depicted in FIG. 9 begins at block 902. In some embodiments, the block 902 may begin after one or more blocks of the process depicted with respect to FIG. 5, and/or is performed additional to and/or alternative to one or more blocks depicted with respect to FIG. 5. In an example context, the process may begin after execution of block 504, and/or may be performed as block 506, such that flow returns to block 508 after execution of the operations depicted with respect to FIG. 9.

At optional block 902, the apparatus 300 includes means, such as the network device management module 310, communications module 308, input/output module 306, processor 302, and/or the like, or a combination thereof, configured to identify a networked device set associated with an accessible communications network. In some embodiments, the accessible communications network comprises one or more communications networks over which the apparatus 300 is configured to communicate, or otherwise within which the apparatus 300 is a component. In this regard, the networked device set may include any number of networked devices configured to connect to and/or communicable via the communication network(s). The networked device set may include networked devices at various layers of the network architecture, for example a L1 device set, a L2 device set, a L3 device set, and/or the like. In some such embodiments, the networked device set includes only networked devices at the same layer, or a lower-layer, than the apparatus 300. For example, in a particular context where the apparatus 300 embodies a risk management system of a L3 device set, the networked device set may form a sub-network architecture comprising a L2 device set and/or a L1 device set. In some embodiments, one or more customized software, hardware, and/or firmware implemented tools may be used to identify the networked device set. Additionally or alternatively, in some embodiments, one or more third-party tools may be used, as described above. In some embodiments, the networked device set includes one or more device identifiers for communicating with each of the networked devices in the set.

At block 904, the apparatus 300 includes means, such as the network device management module 310, communications module 308, input/output module 306, processor 302, and/or the like, or a combination thereof, configured to query a networked device of a networked device set to retrieve a current device configuration data object associated with the queried networked device. In some embodiments, the networked device set was identified at an earlier block, for example at optional block 902. In some embodiments, the apparatus 300 is configured to identify the networked device set as one or more networked devices are detected and/or queried.

The current device configuration data object associated with the networked device may include configuration data associated with one or more aspects of the networked device. For example, in some embodiments, the current device configuration data object includes information associated with one or more software, hardware, and/or firmware configurations of the networked device. In a particular example context, the current device configuration data object may include one or more of (1) hardware identifier data, (2) hardware specification data associated with hardware of the networked device, (3) BIOS version identifier data associated with the BIOS currently installed to the networked device, (4) firmware version identifier data associated with one or more firmware packages currently installed to the networked device, (5) software version identifier data associated with one or more software packages currently installed to the networked device, including but not limited to cybersecurity software packages, and (6) any combination thereof. It should be appreciated that each portion of configuration data associated with a software, hardware, and/or firmware configuration may be associated with a vendor and/or manufacturer entity that manufactures and/or otherwise develops the corresponding software, hardware, and/or firmware. In this regard, each portion of configuration data in the current device configuration data object may include an identifier accessible to the apparatus 300 for identifying a manufacturer and/or developer of the software, hardware, and/or firmware.

In some embodiments, the apparatus 300 is configured to generate and/or transmit, to the networked device, one or more requests embodying the query for the current device configuration data object. For example, the apparatus 300 may generate and/or transmit a query request based on a device identifier associated with the networked device, where the query request is configured to cause the networked device to retrieve and/or identify the current device configuration data object, and respond to the query request with the current device configuration data object. It should be appreciated that, in some embodiments, the query is generated and/or transmitted using one or more customized software, firmware, and/or hardware tools, and/or one or more third-party software, firmware, and/or hardware tools, as described above.

In some embodiments, the apparatus 300 is configured to store the retrieved current device configuration data object in a datastore maintained, and/or accessible by, the apparatus 300. For example, the apparatus 300 may be configured to retrieve the current device configuration data object at one or more pre-determined timestamp intervals (e.g., hourly, daily, weekly, monthly, and/or the like) and store the current device configuration data object in the datastore associated with the device identifier for the networked device. In this regard, the apparatus 300 may retrieve the stored current device configuration data object at a later time, or upon user request for example, for comparison with the updated configuration data object. It should be appreciated that the apparatus may store a current device configuration data object set comprising the current device configuration data object associated with each networked device in the networked device set, as described below.

At block 906, the apparatus 300 includes means, such as the network device management module 310, processor 302, and/or the like, or a combination thereof, configured to compare the current device configuration data object and the updated configuration data object to determine the current device configuration data object indicates a configuration vulnerability. In some embodiments, the apparatus 300 may determine the current device configuration data object indicates a configuration vulnerability when the current device configuration data object and the updated configuration data object do not match. In other embodiments, the apparatus 300 may determine the current device configuration data object indicates a configuration vulnerability when the current device configuration data object represents, or includes, configuration version identifier data associated with a software, hardware, and/or firmware version lower than a non-vulnerable (for example, most up-to-date) version of the software, hardware, and/or firmware, as represented in the updated configuration data object. In a particular context, for example for device configuration data associated with a software package or firmware package, the apparatus may identify a package identifier from device configuration data in the current device configuration data object and/or a current package version from device configuration data in the current device configuration data object, identify a corresponding updated package version for identified package identifier from the updated configuration data object, and compare the current package version with the updated package version to identify whether the versions match. Similarly, in another particular context, for example for device configuration data associated with device hardware, the apparatus may identify a hardware identifier from device configuration data in the current device configuration data object and/or a current hardware version (or specification data) from device configuration data in the current device configuration data object, identify a corresponding updated hardware version the updated configuration data object based on the identified hardware identifier, and compare the current hardware version with the updated hardware version to determine whether the versions match. It should be appreciated that a particular configuration vulnerability, and/or corresponding vulnerability data, may be determined based on the type of device configuration (e.g., hardware, software, and/or firmware), one or more hardware, software, and/or firmware identifiers (e.g., indicating the package and/or hardware being compared), and/or based on other vulnerability data parsed from the updated configuration data object (e.g., where the updated configuration data object includes vulnerability data associated with one or more of previous device configuration version(s)). If the current device configuration data object is determined to indicate a configuration vulnerability, the networked device, or associated information (e.g., device identifier data and/or vulnerability data) may be added to a vulnerable networked device set.

At block 908, the apparatus 300 includes means, such as the network device management module 310, processor 302, and/or the like, or a combination thereof, configured to repeat blocks 904 and 906 for each networked device remaining in the networked device set. In this regard, the apparatus 300 may add networked device(s) that are associated with a configuration vulnerability to the vulnerable networked device set. Upon completion of performing such blocks for each networked device of the networked device set, or at least a particular subset of the networked device set, the vulnerable networked device set may include any zero or more vulnerable networked devices of the networked device set. The apparatus 300 may be configured to determine, from the vulnerable networked device set, the vulnerable networked devices and the identified configuration vulnerabilities (e.g., the software, hardware, and/or firmware associated with the vulnerability). The apparatus 300 may utilize such data in one or more operations, for example those depicted and described above with respect to the remaining blocks of FIG. 5.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., a FPGA or an ASIC. The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for automatic network architecture configuration maintenance, the apparatus comprising at least one processor and at least one memory, the at least one memory having computer-coded instructions thereon, the computer-coded instructions configured to, in execution with the at least one processor, configure the apparatus to:
    retrieve, from an external cloud system, an updated device configurations data object;
    identify a vulnerable networked device set based at least in part on a detected networked device set and the updated device configurations data object;
    generate a device cyber risk score data object set comprising a device cyber risk score data object associated with one or more vulnerable network devices of the vulnerable networked device set; and
    output the device cyber risk score data object set.

2. The apparatus of claim 1, wherein outputting the device cyber risk score data object set comprises providing the device cyber risk score data object set for rendering via a display device.

3. The apparatus of claim 1, further configured to:
    generate a device cyber risk priority data object set comprising a device cyber risk priority data object associated with one or more vulnerable network devices of the vulnerable networked device set; and provide the device cyber risk priority data object set for rendering.

4. The apparatus of claim 1, wherein the updated device configurations data object comprises one or more of updated hardware configuration data, updated software configuration data, or updated firmware configuration data for one or more device types.

5. The apparatus of claim 1, wherein the updated device configurations data object comprises one or more latest BIOS configuration data for one or more device types.

6. The apparatus of claim 1, wherein to retrieve the updated device configurations data object from the external system, the apparatus is configured to:
initiate a proxy service connection with the external system;
transmit a configurations retrieval request to the external system via the proxy service connection; and
receive the updated device configurations data object from the external system.

7. The apparatus of claim 1, wherein the apparatus is associated with a first device layer, and wherein the detected networked device set comprises at least one networked device associated with a lower device layer.

8. The apparatus of claim 1, wherein to identify the vulnerable networked device set, the apparatus is configured to:
select a networked device from the detected networked device set;
query the networked device to retrieve a current device configuration data object;
compare the current device configuration data object and the updated device configurations data object to determine; and
determine, based on the comparison, that the current device configuration data object indicates a configuration vulnerability.

9. The apparatus of claim 8, wherein to determine the current device configuration data object indicates the configuration vulnerability, the apparatus is configured to:
determine that the current device configuration data object does not match the updated device configurations data object.

10. The apparatus of claim 1, further configured to:
identify an update recommendations set based on the device cyber risk score data object set; and
provide the update recommendations set for rendering.

11. The apparatus of claim 1, further configured to:
identify an update recommendations set based on the device cyber risk score data object set; and
cause execution of at least one device update action based on the update recommendations set.

12. A computer-implemented method for automatic network architecture configuration maintenance, the method comprising:
retrieving, from an external cloud system, an updated device configurations data object;
identifying a vulnerable networked device set based at least in part on a detected networked device set and the updated device configurations data object;
generating a device cyber risk score data object set comprising a device cyber risk score data object associated with one or more vulnerable network devices of the vulnerable networked device set; and
outputting the device cyber risk score data object set.

13. The method of claim 12, further comprising:
generating a device cyber risk priority data object set comprising a device cyber risk priority data object associated with one or more vulnerable network devices of the vulnerable networked device set; and
providing the device cyber risk priority data object set for rendering.

14. The method of claim 12, wherein the updated device configurations data object comprises one or more of updated hardware configuration data, updated software configuration data, or updated firmware configuration data for one or more device types.

15. The method of claim 12, wherein retrieving the updated device configurations data object from the external system comprises:
initiating a proxy service connection with the external system;
transmitting a configurations retrieval request to the external system via the proxy service connection; and
receiving the updated device configurations data object from the external system.

16. The method of claim 12, wherein identifying the vulnerable networked device set comprises:
selecting a networked device from the detected networked device set;
querying the networked device to retrieve a current device configuration data object;
comparing the current device configuration data object and the updated device configurations data object to determine; and
determining, based on the comparison, that the current device configuration data object indicates a configuration vulnerability.

17. The method of claim 16, wherein determining the current device configuration data object indicates the configuration vulnerability comprises:
determining that the current device configuration data object does not match the updated device configurations data object.

18. The method of claim 12, further configured to:
identifying an update recommendations set based on the device cyber risk score data object set; and
providing the update recommendations set for rendering.

19. The method of claim 12, further configured to:
identifying an update recommendations set based on the device cyber risk score data object set; and
causing execution of at least one device update action based on the update recommendations set.

20. A computer program product for automatic network architecture configuration maintenance, the computer program product comprising at least one non-transitory computer-readable storage medium having computer program instructions thereon, the computer program instructions, in execution with a processor, configured to:
retrieve, from an external cloud system, an updated device configurations data object;
identify a vulnerable networked device set based at least in part on a detected networked device set and the updated device configurations data object;
generate a device cyber risk score data object set comprising a device cyber risk score data object associated with one or more vulnerable network devices of the vulnerable networked device set; and
output the device cyber risk score data object set.

* * * * *